(12) United States Patent
Tang et al.

(10) Patent No.: US 12,422,712 B2
(45) Date of Patent: Sep. 23, 2025

(54) LIGHT-EMITTING SUBSTRATE AND METHOD OF MANUFACTURING THE SAME, BACKLIGHT MODULE AND DISPLAY APPARATUS

(71) Applicants: Hefei BOE Ruisheng Technology Co., Ltd., Anhui (CN); BOE TECHNOLOGY GROUP CO., LTD., Beijing (CN)

(72) Inventors: Hai Tang, Beijing (CN); Xiaolin Geng, Beijing (CN); Ming Zhai, Beijing (CN); Liang Gao, Beijing (CN); Bing Zhang, Beijing (CN); Wei Huang, Beijing (CN)

(73) Assignees: Hefei BOE Ruisheng Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/264,451

(22) PCT Filed: May 31, 2022

(86) PCT No.: PCT/CN2022/096209
§ 371 (c)(1),
(2) Date: Aug. 7, 2023

(87) PCT Pub. No.: WO2023/230830
PCT Pub. Date: Dec. 7, 2023

(65) Prior Publication Data
US 2024/0427189 A1    Dec. 26, 2024

(51) Int. Cl.
*G02F 1/00* (2006.01)
*G02F 1/1335* (2006.01)
*G02F 1/13357* (2006.01)

(52) U.S. Cl.
CPC .. *G02F 1/133605* (2013.01); *G02F 1/133611* (2013.01); *G02F 1/133612* (2021.01);
(Continued)

(58) Field of Classification Search
None
See application file for complete search history.

(56) References Cited

U.S. PATENT DOCUMENTS

2015/0160402 A1    6/2015    Kim et al.
2021/0336212 A1    10/2021    Long
(Continued)

FOREIGN PATENT DOCUMENTS

CN    105977348 A    9/2016
CN    109326585 A    2/2019
(Continued)

OTHER PUBLICATIONS

PCT International Search Report (w/ English translation) and Written Opinion for corresponding PCT Application No. PCT/CN2022/096209, mailed Feb. 22, 2023, 11 pages.
(Continued)

*Primary Examiner* — Abdulmajeed Aziz
(74) *Attorney, Agent, or Firm* — Dority & Manning, P.A.

(57) ABSTRACT

A light-emitting substrate includes a substrate, and a plurality of light-emitting devices and a reflective layer that are disposed on a side of the substrate. The reflective layer has a plurality of openings, and the plurality of openings include a plurality of first openings; a light-emitting device is located in a first opening. A surface of the reflective layer away from the substrate has a plurality of protruding structures.

17 Claims, 19 Drawing Sheets

(52) U.S. Cl.
CPC .. *G02F 1/133514* (2013.01); *G02F 1/133603* (2013.01); *G02F 1/133606* (2013.01)

(56) References Cited

U.S. PATENT DOCUMENTS

| | | | |
|---|---|---|---|
| 2022/0028933 A1 | 1/2022 | He et al. | |
| 2022/0137458 A1* | 5/2022 | Liu | G02F 1/13332 362/97.3 |
| 2022/0163849 A1 | 5/2022 | Tien et al. | |
| 2022/0206339 A1 | 6/2022 | Sun et al. | |
| 2022/0269137 A1* | 8/2022 | Hashimoto | G02F 1/133603 |
| 2022/0310873 A1 | 9/2022 | Liu | |
| 2022/0317517 A1* | 10/2022 | Yu | G02F 1/133607 |
| 2022/0375911 A1 | 11/2022 | Li et al. | |
| 2024/0160063 A1* | 5/2024 | Sun | G02F 1/133605 |
| 2024/0377677 A1* | 11/2024 | Qin | G02F 1/1336 |

FOREIGN PATENT DOCUMENTS

| | | |
|---|---|---|
| CN | 111061091 A | 4/2020 |
| CN | 112198713 A | 1/2021 |
| CN | 112713166 A | 4/2021 |
| CN | 113064301 A | 7/2021 |
| CN | 113126363 A | 7/2021 |
| CN | 113777826 A | 12/2021 |
| CN | 113889562 A | 1/2022 |
| CN | 113985652 A | 1/2022 |
| CN | 215680685 U | 1/2022 |
| CN | 215896398 U | 2/2022 |
| CN | 215986820 U | 3/2022 |
| CN | 114442370 A | 5/2022 |
| CN | 114447200 A | 5/2022 |
| CN | 114527603 A | 5/2022 |
| EP | 4207291 A1 | 7/2023 |
| EP | 4307038 A1 | 1/2024 |
| JP | 2006066282 A | 3/2006 |
| JP | 2011165434 A | 8/2011 |
| KR | 20090103292 A | 10/2009 |
| KR | 102059126 B1 | 12/2019 |

OTHER PUBLICATIONS

International Search Report and Written Opinion (with English translation) received in corresponding PCT Application No. PCT/CN2022/109938, dated Apr. 13, 2023, 12 pages.

International Search Report and Written Opinion (with English translation) received in corresponding PCT Application No. PCT/CN2022/128351, dated Mar. 19, 2023, 13 pages.

International Search Report and Written Opinion (with English translation) received in corresponding PCT Application No. PCT/CN2023/085258, dated Dec. 1, 2023, 14 pages.

B. Zhang et al., "Research on Modification of Warpage Printing Ink for MiniLED Substrate", SID Symposium Digest of Technical Papers, May 2021, vol. 52, Issue 1, pp. 1201-1203.

* cited by examiner

LIGHT-EMITTING SUBSTRATE AND METHOD OF MANUFACTURING THE SAME, BACKLIGHT MODULE AND DISPLAY APPARATUS

CROSS-REFERENCE TO RELATED APPLICATION

This application is a national phase entry under 35 USC 371 of International Patent Application No. PCT/CN2022/096209, filed on May 31, 2022, which is incorporated herein by reference in its entirety.

TECHNICAL FIELD

The present disclosure relates to the field of display technologies, and in particular, to a light-emitting substrate and a method of manufacturing the same, a backlight module and a display apparatus.

BACKGROUND

Mini light emitting diodes (mini LEDs) and micro light emitting diodes (micro LEDs) have been applied to the fields of small-sized displays, medium-sized displays (e.g., mobile phones and televisions) and large-sized displays (e.g., screens in cinemas) due to their advantages of self-luminescence, high efficiency, high luminance, high reliability, energy saving, fast response speed and the like.

SUMMARY

In an aspect, a light-emitting substrate is provided. The light-emitting substrate includes a substrate, and a plurality of light-emitting devices and a reflective layer that are disposed on a side of the substrate. The reflective layer has a plurality of openings, and the plurality of openings include a plurality of first openings; a light-emitting device is located in a first opening. A surface of the reflective layer away from the substrate has a plurality of protruding structures.

In some embodiments, the reflective layer includes a plurality of first portions and a plurality of second portions, a first portion is a portion, corresponding to a protruding structure, of the reflective layer, and a second portion is a portion, located between two adjacent protruding structures, of the reflective layer. A difference between a thickness of the first portion and a thickness of the second portion is less than or equal to 20 µm; and/or the difference between the thickness of the first portion and the thickness of the second portion is less than or equal to 20% of a thickness of the reflective layer.

In some embodiments, a distance between the light-emitting device and a sidewall of the respective first opening is in a range from 0.05 mm to 0.3 mm.

In some embodiments, an included angle between at least one sidewall of the first opening and the substrate is an acute angle.

In some embodiments, at least one sidewall of the first opening is in a shape of a curved surface.

In some embodiments, a surface of the protruding structure away from the substrate is in a shape of a cambered surface.

In some embodiments, the plurality of protruding structures include a plurality of first protruding structures and a plurality of second protruding structures. The plurality of first protruding structures each extend in a first direction and are arranged in rows in a second direction; the plurality of second protruding structures each extend in the first direction and are arranged in rows in the second direction, or the plurality of second protruding structures each extend in the second direction and are arranged in columns in the first direction. The first direction intersects the second direction.

In some embodiments, a dimension, in a direction where the plurality of first protruding structures are arranged, of a first protruding structure is greater than or equal to a dimension, in a direction where the plurality of second protruding structures are arranged, of a second protruding structure.

In some embodiments, at least one edge of an orthographic projection, on the substrate, of the reflective layer includes a plurality of curved segments, and at least one curved segment protrudes towards a direction where an edge of the substrate is located.

In some embodiments, an included angle between at least one side surface, proximate to an edge of the substrate, of the reflective layer and the substrate is an acute angle.

In some embodiments, the light-emitting substrate further includes a plurality of driving chips disposed on a side, the same as the side where the plurality of light-emitting devices are located, of the substrate. A driving chip is electrically connected to at least one light-emitting device, and the driving chip is configured to drive the at least one light-emitting device to emit light. The plurality of openings further include a plurality of second openings. The driving chip is located in a second opening.

In some embodiments, the light-emitting substrate further includes a plurality of driving chips disposed on a side, the same as the side where the plurality of light-emitting devices are located, of the substrate. A driving chip is electrically connected to at least one light-emitting device, and the driving chip is configured to drive the at least one light-emitting device to emit light. An orthographic projection of at least one driving chip on the substrate is located within an orthographic projection of the reflective layer on the substrate.

In some embodiments, a thickness of a portion, in contact with a top surface of the at least one driving chip, of the reflective layer is less than or equal to a thickness of a portion, in contact with the substrate, of the reflective layer.

In some embodiments, at least one side surface of the at least one driving chip and the reflective layer are provided with a gap therebetween.

In some embodiments, the reflective layer is discontinuous at at least one side surface of the at least one driving chip.

In another aspect, a method of manufacturing a light-emitting substrate is provided. The method includes: providing a substrate; fixing a plurality of light-emitting devices on the substrate; and forming a reflective layer on the substrate by three-dimensional (3D) printing. The reflective layer has a plurality of openings, and the plurality of openings include a plurality of first openings; a light-emitting device is located in a first opening; a surface of the reflective layer away from the substrate has a plurality of protruding structures.

In some embodiments, the plurality of light-emitting devices are arranged in a plurality of columns in a first direction, and are arranged in a plurality of rows in a second direction; the first direction intersects the second direction. The substrate has a plurality of first printing regions, a plurality of second printing regions and a plurality of third printing regions each extending in the first direction; the plurality of second printing regions and the plurality of third printing regions are alternately arranged, and any adjacent second printing region and third printing region are provided a first printing region therebetween. A row of light-emitting devices are located in a second printing region. Forming the reflective layer on the substrate by 3D printing includes: forming, by straight line printing, first reflective patterns in two first printing regions that are on two opposite sides of each row of light-emitting devices; forming, by dashed line printing, a second reflective pattern between any two adjacent light-emitting devices in each second printing region; first reflective patterns and second reflective patterns that are around each light-emitting device enclosing a respective first opening, an included angle between at least one sidewall of the first opening and the substrate being an acute angle, and/or at least one sidewall of the first opening being a curved surface; and forming third reflective patterns in the third printing regions by straight line printing.

In some embodiments, before forming the reflective layer on the substrate by 3D printing, the method further includes: fixing a plurality of driving chips on the substrate. The plurality of driving chips are arranged in columns in the first direction, and are arranged in rows in the second direction; a row of driving chips are located in another second printing region. The plurality of openings further include a plurality of second openings. Forming the reflective layer on the substrate by 3D printing further includes: forming, by straight line printing, first reflective patterns in two first printing regions that are on two opposite sides of each row of driving chips; and forming, by dashed line printing, a second reflective pattern between any two adjacent driving chips in each second printing region. First reflective patterns and second reflective patterns that are around each driving chip enclose a second opening; an included angle between at least one sidewall of the second opening and the substrate is an acute angle, and/or at least one sidewall of the second opening is a curved surface.

In some embodiments, before forming the reflective layer on the substrate by 3D printing, the method further includes: fixing a plurality of driving chips on the substrate. The plurality of driving chips are arranged in columns in the first direction, and are arranged in rows in the second direction; at least part of the plurality of driving chips are located in the plurality of third printing regions. Forming the reflective layer on the substrate by 3D printing includes: forming, by straight line printing, the third reflective patterns in the third printing regions where the at least part of the plurality of driving chips are located. Orthographic projections of the at least part of the plurality of driving chips on the substrate are located within orthographic projections of the third reflective patterns on the substrate.

In some embodiments, a printing direction of straight line printing is the same as or perpendicular to a printing direction of dashed line printing.

In yet another aspect, a backlight module is provided. The backlight module includes the light-emitting substrate as described in any one of the above embodiments, and an optical film located on a light exit side of the light-emitting substrate.

In yet another aspect, a display apparatus is provided. The display apparatus includes the backlight module as described in the above embodiments, a color filter substrate located on a light exit side of the backlight module, and an array substrate located between the backlight module and the color filter substrate.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products and actual processes of methods involved in the embodiments of the present disclosure.

FIG. 11b is a partial structural diagram of a material object corresponding to the reflective layer shown in FIG. 11a;

FIG. 17b is a partial structural diagram of a material object corresponding to the light-emitting substrate shown in FIG. 17a;

FIG. 21b is a partial structural diagram of a material object corresponding to the light-emitting substrate shown in FIG. 21a;

FIG. 23b is a partial structural diagram of a material object corresponding to the light-emitting substrate shown in FIG. 23a.

DETAILED DESCRIPTION

Figure 1:
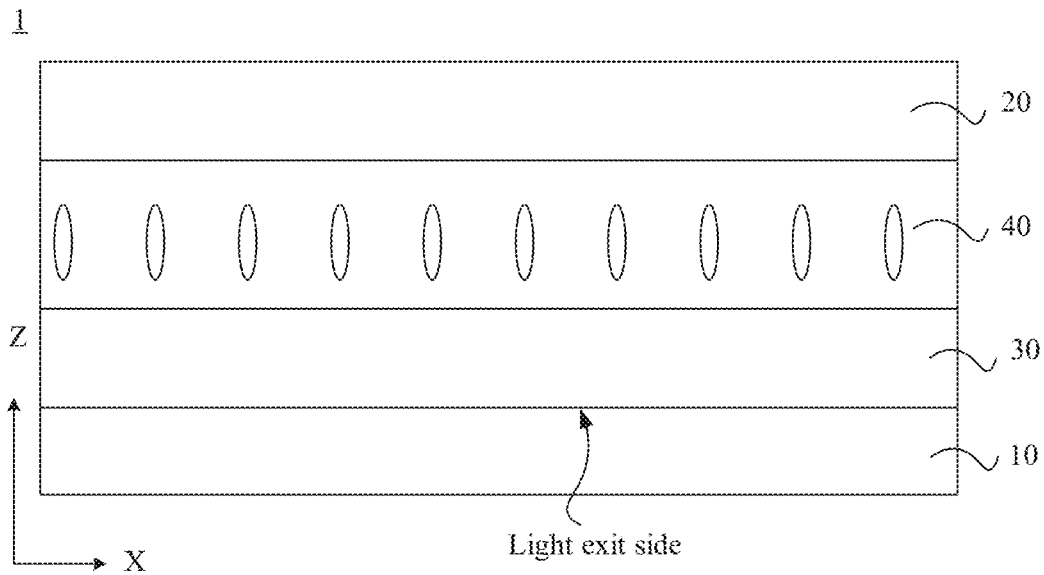
FIG. 1 is a structural diagram of a display apparatus, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "connected" and derivatives thereof may be used. For example, the term "connected" may be used in the description of some embodiments to indicate that two or more components are in direct physical or electrical contact with each other. The embodiments disclosed herein are not necessarily limited to the content herein.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected" or "in response to detecting [the stated condition or event]".

The phrase "applicable to" or "configured to" as used herein indicates an open and inclusive expression, which does not exclude devices that are applicable to or configured to perform additional tasks or steps.

Additionally, the phase "based on" as used herein is meant to be open and inclusive, since a process, a step, a calculation or other action that is "based on" one or more of stated conditions or values may, in practice, be based on additional conditions or values beyond those stated.

As used herein, the term such as "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

As used herein, the term such as "perpendicular" or "equal" includes a stated condition and a condition similar to the stated condition, a range of the similar condition is within an acceptable range of deviation, and the acceptable range of deviation is determined by a person of ordinary skill in the art, considering measurement in question and errors associated with measurement of a particular quantity (i.e., limitations of a measurement system). For example, the term "perpendicular" includes absolute perpendicularity and approximate perpendicularity, and an acceptable range of deviation of the approximate perpendicularity may be, for example, a deviation within 5°; the term "equal" includes absolute equality and approximate equality, and an acceptable range of deviation of the approximate equality may be that, for example, a difference between the two that are equal is less than or equal to 5% of either of the two.

It will be understood that, in a case where a layer or an element is referred to as being on another layer or a substrate, it may be that the layer or the element is directly on the another layer or the substrate, or there may be a middle layer between the layer or the element and the another layer or the substrate.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a display apparatus 1 (as shown in FIG. 1). The display apparatus 1 may be any display apparatus that displays text or images whether in motion (e.g., a video) or stationary (e.g., a still image). More specifically, it is anticipated that the display apparatus in the embodiments may be implemented in a variety of electronic apparatuses or associated with a variety of electronic apparatuses. The variety of electronic apparatuses include, but are not limited to, mobile phones, wireless apparatuses, personal digital assistants (PDAs), hand-held or portable computers, global positioning system (GPS) receivers/navigators, cameras, moving picture experts group 4 (MP4) video players, video cameras, game consoles, watches, clocks, calculators, television monitors, tablet monitors, computer monitors, automobile displays (e.g., odometer displays), navigators, cockpit controllers and/or displays, camera view displays (e.g., displays of rear-view cameras in vehicles), electronic photos, electronic billboards or signs, projectors, building structures, packaging and aesthetic structures (e.g., displays for displaying an image of a piece of jewelry).

In some examples, the display apparatus 1 may be a liquid crystal display (LCD) display apparatus.

In some examples, as shown in FIG. 1, the display apparatus 1 includes a backlight module 10, a color filter substrate 20 located on a light exit side of the backlight module 10, and an array substrate 30 located between the backlight module 10 and the color filter substrate 20.

For example, the backlight module 10 may be used as a light source for providing backlight. For example, the backlight provided by the backlight module 10 may be white light or blue light.

For example, the light exit side of the backlight module 10 refers to a side of the backlight module 10 that emits light.

For example, the array substrate 30 may include a plurality of pixel driving circuits and a plurality of pixel electrodes, and the plurality of pixel driving circuits may be arranged, for example, in an array. The plurality of pixel driving circuits are electrically connected to the plurality of pixel electrodes in a one-to-one correspondence, and the pixel driving circuits each provide a pixel voltage for a respective pixel electrode.

For example, the color filter substrate 20 may include a variety of color filters. For example, in a case where the backlight provided by the backlight module 10 is white light, the color filters may include a red filter, a green filter and a blue filter. For example, the red filter may transmit only red light of incident light, the green filter may transmit only green light of the incident light, and the blue filter may transmit only blue light of the incident light. For another example, in a case where the backlight provided by the backlight module 10 is blue light, the color filters may include a red filter and a green filter.

For example, the color filter substrate 20 further includes a common electrode. The common electrode may receive a common voltage.

In some examples, as shown in FIG. 1, the display apparatus 1 further includes a liquid crystal layer 40 located between the color filter substrate 20 and the array substrate 30.

For example, the liquid crystal layer 40 includes a plurality of liquid crystal molecules. For example, an electric field may be created between a pixel electrode and a common electrode, and liquid crystal molecules located between the pixel electrode and the common electrode may be deflected due to an action of the electric field.

It will be understood that the backlight provided by the backlight module 10 may be incident on the liquid crystal molecules in the liquid crystal layer 40 through the array substrate 30. The liquid crystal molecules are deflected due to the action of the electric field created between the pixel electrode and the common electrode, so as to change an amount of light transmitted through the liquid crystal molecules, so that light transmitted through the liquid crystal molecules reaches preset luminance. The light exits after passing through the color filters of different colors in the color filter substrate 20. The exiting light includes light of various colors such as red light, green light and blue light, and a mutual cooperation of the light of various colors achieves display of the display apparatus 1.

For example, a type of the backlight module 10 in the display apparatus 1 varies, which may be set according to actual situations and is not limited in the embodiments of the present disclosure.

For example, the backlight module 10 may be an edge-lit backlight module. Alternatively, the backlight module 10 may be a direct-lit backlight module.

For convenience of description, the following embodiments of the present disclosure are described by taking an example where the backlight module 10 is the direct-lit backlight module.

Figure 2:
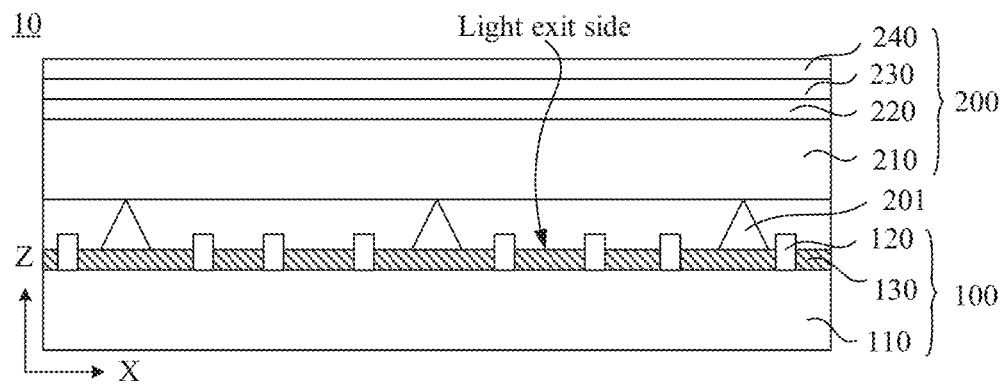
FIG. 2 is a structural diagram of a backlight module, in accordance with some embodiments of the present disclosure.

In some embodiments, as shown in FIG. 2, the backlight module 10 includes a light-emitting substrate 100 and an optical film 200 located on a light exit side of the light-emitting substrate 100.

For example, as shown in FIG. 2, the optical film 200 includes a diffuser plate 210, a quantum dot film 220, a diffuser sheet 230 and a composite film 240 that are sequentially stacked on the light exit side of the light-emitting substrate 100.

For example, the diffuser plate 210 and the diffuser sheet 230 are used for eliminating a lamp shadow and making light emitted from the light-emitting substrate 100 to be uniform to improve a uniformity of the light.

For example, the quantum dot film 220 is used for converting the light emitted from the light-emitting substrate 100. Optionally, in a case where the light emitted from the light-emitting substrate 100 is blue light, the quantum dot film 220 may convert the blue light into white light and improve purity of the white light.

For example, the composite film 240 is used for improving luminance of the light emitted from the light-emitting substrate 100.

It will be understood that luminance of light emitted from the light-emitting substrate 100, incident on and then exiting from the optical film 200 is improved, and the exiting light has a high purity and a good uniformity.

In some examples, as shown in FIG. 2, the backlight module 10 further includes support pillars 201 disposed between the light-emitting substrate 100 (e.g., a reflective layer 130 of the light-emitting substrate 100) and the diffuser plate 210 of the optical film 200. As for the reflective layer 130, reference may be made to the following description, which will not be repeated here.

For example, the support pillars 201 may be fixed on the light-emitting substrate 100 by adhesive. The support pillars 201 may be used for supporting the optical film 200, so as to provide a certain light mixing distance for the light emitted from the light-emitting substrate 100. As a result, the lamp shadow is further eliminated, and the uniformity of the light is improved.

In some embodiments, as shown in FIG. 2, the light-emitting substrate 100 includes a substrate 110, and a plurality of light-emitting devices 120 and the reflective layer 130 that are disposed on a side of the substrate 110.

In some examples, the substrate 110 may be a flexible substrate. The flexible substrate may be, for example, a polyethylene terephthalate (PET) substrate, a polyethylene naphthalate two formic acid glycol ester (PEN) substrate or a polyimide (PI) substrate.

In some other examples, the substrate 110 may be a rigid substrate. For example, a material of the substrate may be glass. The substrate 110 may be a printed circuit board (PCB) or an aluminum substrate.

In some examples, the plurality of light-emitting devices 120 may be light emitting diodes (LEDs), mini LEDs or micro LEDs.

Figure 3:
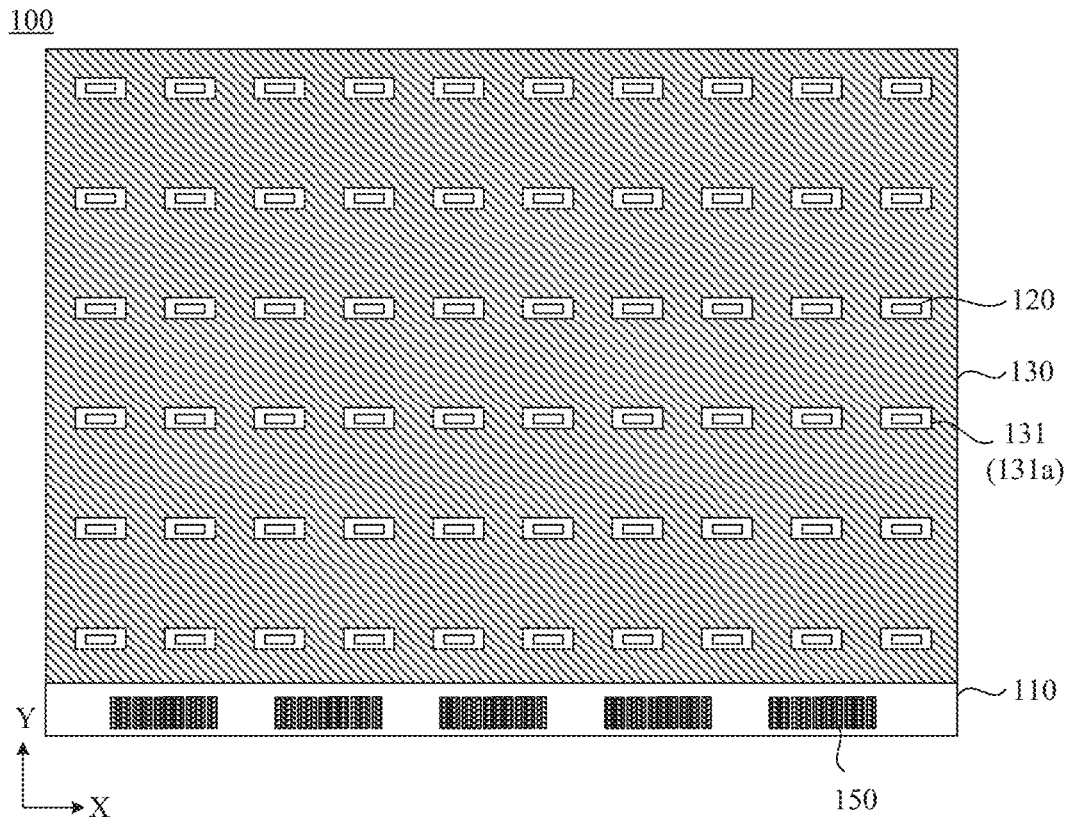
FIG. 3 is a structural diagram of a light-emitting substrate, in accordance with some embodiments of the present disclosure.

For example, as shown in FIG. 3, the plurality of light-emitting devices 120 may be arranged in a plurality of columns in a first direction X and in a plurality of rows in a second direction Y.

For example, an included angle between the first direction X and the second direction Y may be 85°, 90°, 95° or the like. The embodiments of the present disclosure will be described by taking an example where the included angle between the first direction X and the second direction Y is 90°.

For example, the light-emitting devices 120 may serve as a light source of the light-emitting substrate 100.

For example, the light-emitting substrate 100 further includes an alignment mark and a panel identity document (ID) that are disposed on the substrate 110.

For example, the alignment mark is used for achieving an installation alignment between the light-emitting substrate 100 and the optical film 200. The panel ID is used for labeling and identifying a single light-emitting substrate 100. Thus, the alignment mark and the panel ID need to be each exposed on the reflective layer 130, so as to facilitate the alignment or the identification.

In some examples, as shown in FIG. 3, the reflective layer 130 has a plurality of openings 131.

For example, the plurality of openings 131 of the reflective layer 130 are used for exposing devices, such as the light-emitting devices 120 (or the alignment mark and the panel ID that are mentioned above), located on the substrate 110 from a surface of the reflective layer 130, so as to prevent the reflective layer 130 from covering the light-emitting devices 120 and blocking light emitted from the light-emitting devices 120. As a result, it is possible to prevent luminous efficiencies of the light-emitting devices 120 from being affected, so that a luminous efficiency of the light-emitting substrate 100 may be improved.

For example, the plurality of openings 131 include a plurality of first openings 131a. A light-emitting device 120 is located in a first opening 131a.

For example, the plurality of first openings 131a and the plurality of light-emitting devices 120 may be disposed in a one-to-one correspondence.

In some examples, the reflective layer 130 has a certain reflectivity and may reflect the light emitted from the plurality of light-emitting devices 120, thereby improving a light utilization ratio of the light-emitting devices 120.

For example, an area of a first opening 131a may be greater than or equal to an area of a respective light-emitting device 120, and a center of the first opening 131a coincides with a center of the respective light-emitting device 120.

With the above arrangement, the light emitted from the light-emitting device 120 may be prevented from being blocked by an edge of the reflective layer 130 as much as possible, so that the luminous efficiency of the light-emitting substrate 100 may be improved.

In an implementation, a method used for manufacturing the light-emitting substrate may vary according to a different size of the light-emitting substrate. For example, for a large-sized light-emitting substrate, the manufacturing method generally includes steps of preparing materials, manufacturing a reflective layer by silk-screen printing, automated optical inspection (AOI), die bonding, dot patching, AOI and encapsulating. For another example, for a medium-to-large-sized light-emitting substrate (a glass substrate) or a small-to-medium-sized light-emitting substrate (a PCB substrate), the manufacturing method generally includes steps of preparing materials, manufacturing a reflective layer by silk-screen printing, exposure, development, AOI, die bonding and encapsulating. In each of the two manufacturing methods, the reflective layer is manufactured before the die bonding process. The die bonding process includes a reflow soldering process. The reflow soldering process may cause, due to a relatively high temperature of the reflow soldering process, phenomena such as oxidation and yellowing of a material of the previously formed reflective layer, so that the reflectivity of the reflective layer is reduced, and thus a luminous efficiency of the light-emitting substrate is reduced, and luminance of the light-emitting module and the display apparatus is reduced. In addition, in each of the two manufacturing methods, after the reflective layer is manufactured, the material of the reflective layer is prone to be deposited on a bonding pad connected to the light-emitting device, which is prone to cause a risk of turn-off of the light-emitting device or rosin joint. Moreover, during a process of fixing a single light-emitting device in the die bonding process, the previously formed reflective layer is easy to adhere to light-emitting devices, which makes it easy for multiple light-emitting devices to be fixed simultaneously, and thereby causes a problem of errors in fixed positions of the light-emitting devices.

Figure 4A:
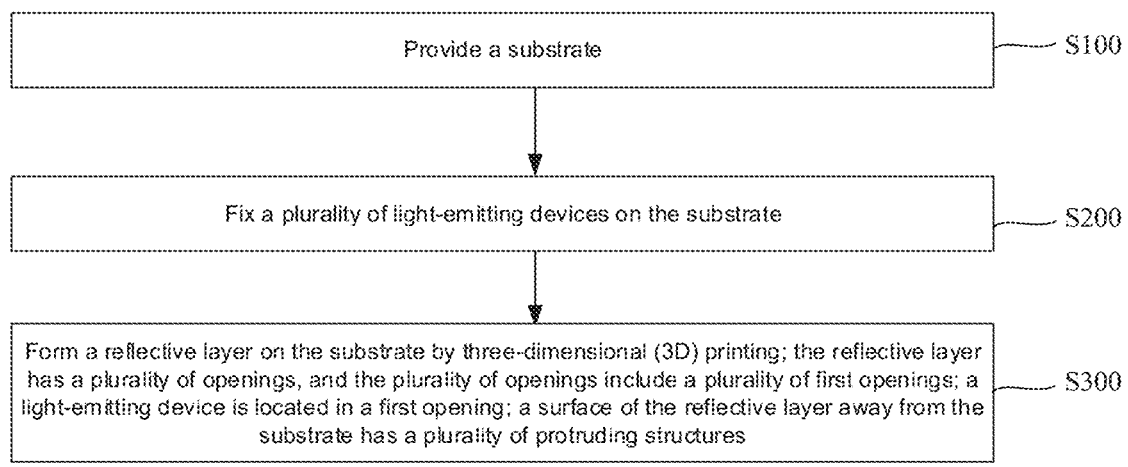
FIG. 4a is a diagram showing steps of a method of manufacturing a light-emitting substrate, in accordance with some embodiments of the present disclosure.

In light of this, some embodiments of the present disclosure provide a method of manufacturing a light-emitting substrate 100. As shown in FIG. 4a, the method includes S100 to S300.

Figure 4B:
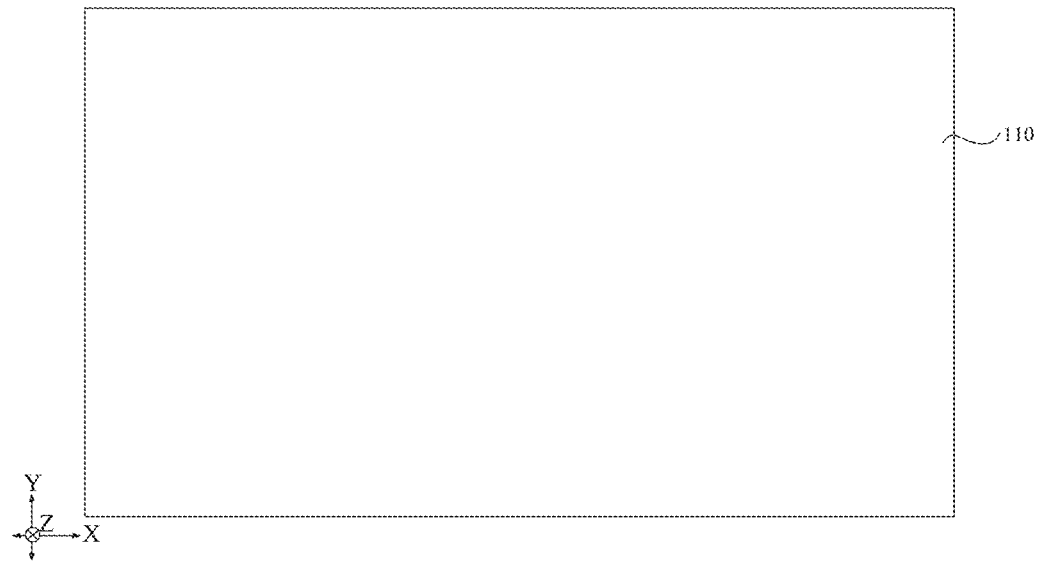
FIG. 4b is a diagram showing a process of manufacturing a light-emitting substrate, in accordance with some embodiments of the present disclosure.

In S100, as shown in FIG. 4b, a substrate 110 is provided.

In some examples, the substrate 110 may be a PET substrate, a PI substrate, a PEN substrate, a glass substrate, a PCB substrate or an aluminum substrate.

Figure 4C:
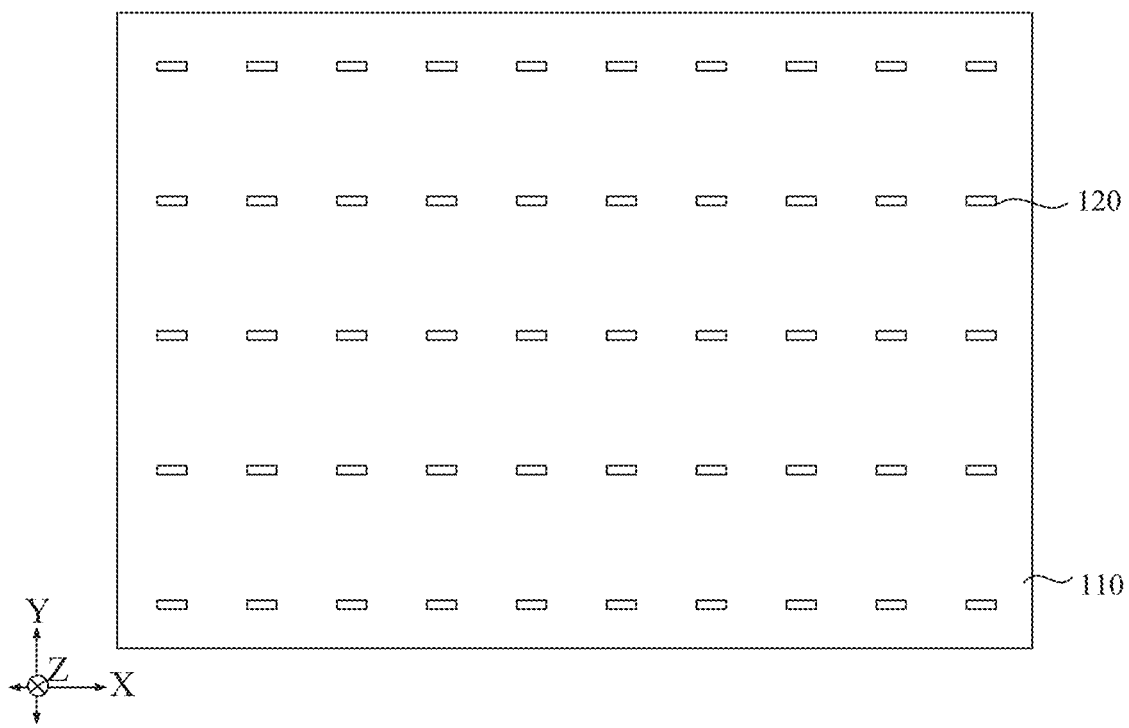
FIG. 4c is a diagram showing a process of manufacturing a light-emitting substrate, in accordance with some other embodiments of the present disclosure.

In S200, as shown in FIG. 4c, a plurality of light-emitting devices 120 are fixed on the substrate 110.

For example, the plurality of light-emitting devices 120 may be fixed on the substrate 110 by using a die bonding process.

For example, the light-emitting device 120 may be an LED, a micro LED or a mini LED.

In an example where the light-emitting device 120 is the mini LED, a structure of the mini LED may include a normal structure, a vertical structure or a flip-chip structure.

For example, the plurality of light-emitting devices 120 may be distributed on the substrate 110 uniformly, so that light emitted from an entire surface of the light-emitting substrate 100 is relatively uniform. As a result, a display quality of the backlight module 10 and the display apparatus 1 is improved.

Figure 4D:
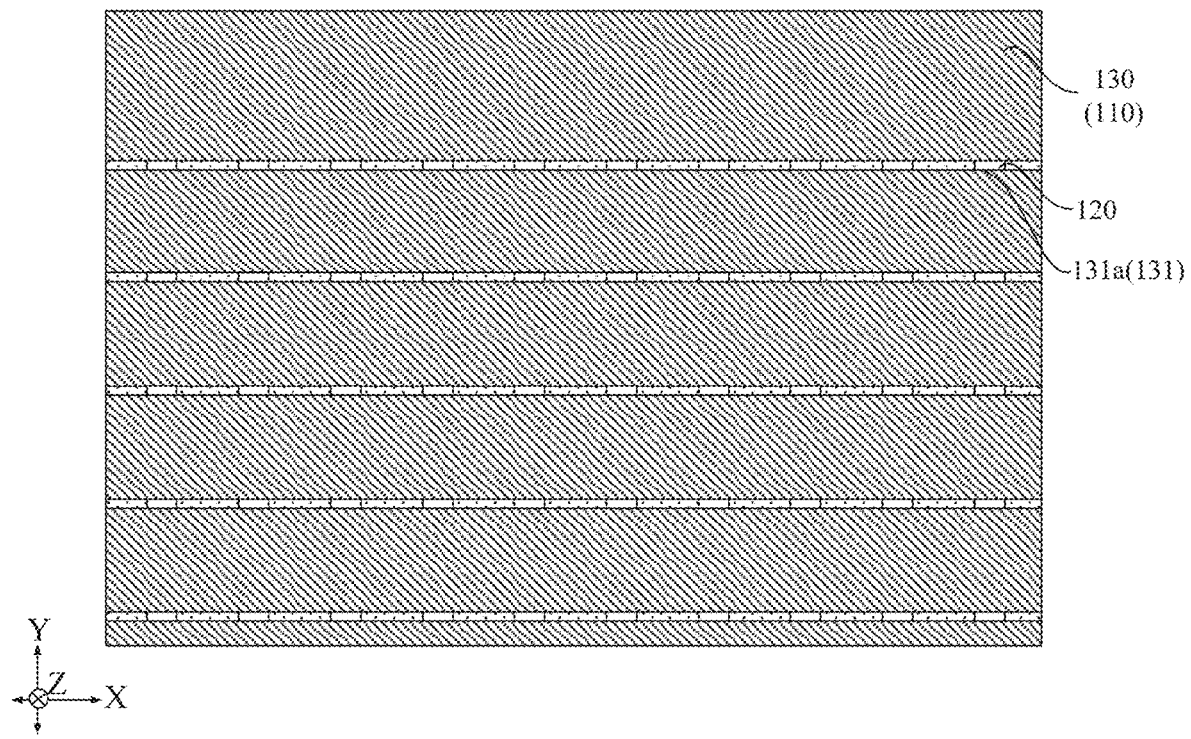
FIG. 4d is a diagram showing a process of manufacturing light-emitting substrate, in accordance with some other embodiments of the present disclosure.
Figure 5A:
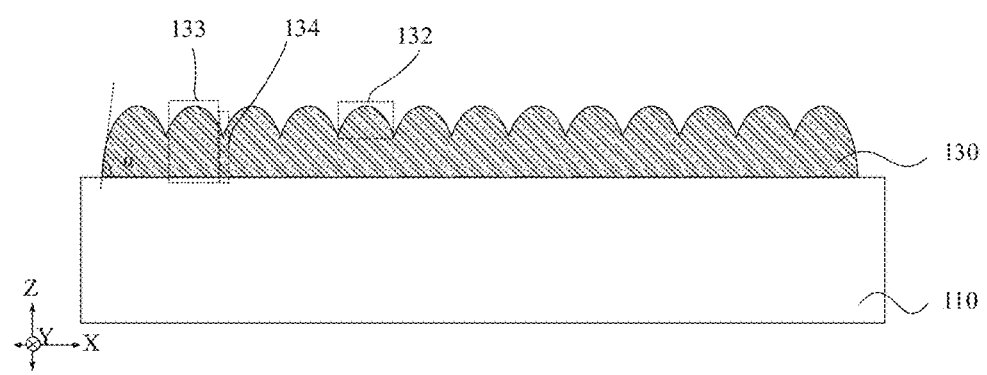
FIG. 5a is a diagram showing partial structures of a substrate and a reflective layer, in accordance with some embodiments of the present disclosure.

In S300, as shown in FIG. 4d, a reflective layer 130 is formed on the substrate 110 by three-dimensional (3D) printing. The reflective layer 130 has a plurality of openings 131, and the plurality of openings 131 include a plurality of first openings 131a. A light-emitting device 120 is located in a first opening 131a. As shown in FIG. 5a, a surface of the reflective layer 130 away from the substrate 110 has a plurality of protruding structures 132.

In some examples, a material of the reflective layer 130 may include an epoxy resin, a silicone resin containing phenyl groups and a polytetrafluoro-ethylene resin.

For example, in the embodiments of the present disclosure, a 3D printing process may be performed by using a 3D printing device. The 3D printing device includes a plurality of printing nozzles each having a same function, and the printing nozzles are each provided with a printing spray valve thereon. The material of the reflective layer 130 is put into the 3D printing device after a certain pretreatment, and the printing spray valve is moved on the substrate 110 according to a set printing path by controlling a state of the printing spray valve, so that the material of the reflective layer 130 is ejected from the printing spray valve in a form of dots. The dots of the material of the reflective layer 130 are adhered together after dripping onto the substrate 110, so as to form a printing bar (as shown in FIG. 5c) extending in the printing path OP. All printing bars form the reflective layer 130. The printing spray valve is closed in regions of the substrate 110 that respectively correspond to the plurality of openings 131 of the reflective layer 130, so that the plurality of openings 131 are formed.

For example, FIG. 5a shows a morphology feature of the reflective layer 130. In 3D printing, the dots drip and are adhered together to form the printing bar, and all the printing bars overlap with one another to form the reflective layer, so that the surface of the reflective layer 130 away from the substrate 110 has the plurality of protruding structures 132.

Figure 5B:
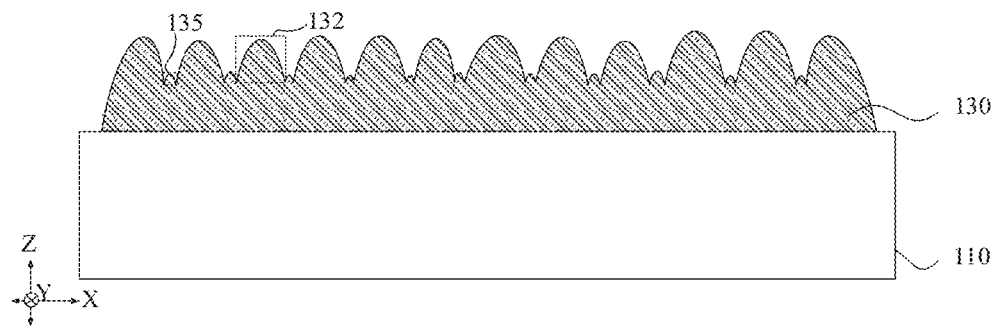
FIG. 5b is a diagram showing partial structures of a substrate and another reflective layer, in accordance with some embodiments of the present disclosure.
Figure 5C:
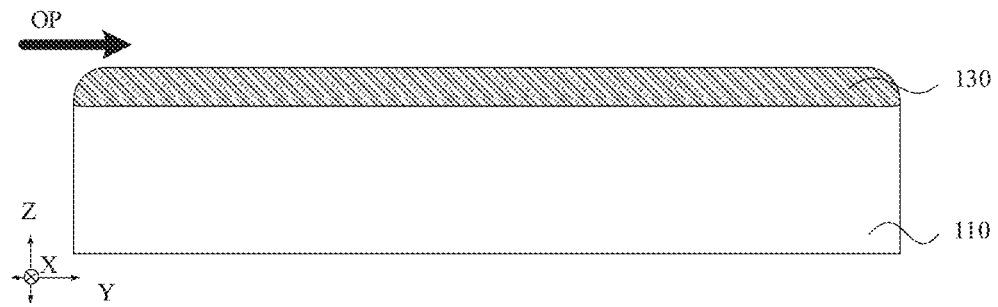
FIG. 5c is a diagram showing partial structures of a substrate and yet another reflective layer, in accordance with some embodiments of the present disclosure.

For example, FIG. 5b shows another morphology feature of the reflective layer 130. In a thickness direction (i.e., a third direction Z in the figure) of the substrate 110, a small protruding structure 135 may be formed on an overlapping portion between two adjacent printing bars, and the small protruding structure 135 is located between the two adjacent printing bars 132.

For example, a degree of freedom of 3D printing is high, non-contact ejecting is performed between the printing nozzle and the substrate 110 to be printed, and a dimensional accuracy corresponding to the formed reflective layer 130 and a dimensional accuracy of the formed opening 131 are both relatively high, so that it is conducive to improving a proportion of an area, occupied by the reflectively layer 130, of the substrate 110. As a result, it is possible to improve the reflectivity of the reflective layer 130, so that the utilization ratio of the light emitted from the light-emitting devices 120 is improved.

In the embodiments of the present disclosure, the light-emitting substrate 100 is manufactured by using the above method in which the light-emitting devices 120 are fixed on the substrate 110 and then the reflective layer 130 is formed by 3D printing. Thus, the reflective layer 130 is formed after the die bonding process (which refers to the process of fixing the light-emitting devices 120 on the substrate 110 here), which may make the material of the reflective layer is not deposited on a pad connected to the light-emitting device, so that it is possible to avoid a risk of turn-off or rosin joint that is prone to occur due to a fact that the material of the reflective layer is deposited on the pad in a case where the reflective layer is formed previously. As a result, a yield of the light-emitting substrate 100 is improved. In addition, it is possible to avoid a risk of a reduction, caused by a reflow soldering process in the die bonding process, in the reflectivity of the reflective layer 130. As a result, it is possible to improve a light efficiency of the reflective layer 130 and the luminous efficiency of the light-emitting substrate 100, which improves display luminance of the backlight module 10 and the display apparatus 1, and reduces power consumption of the backlight module 10 and the display apparatus 1.

Figure 6A:
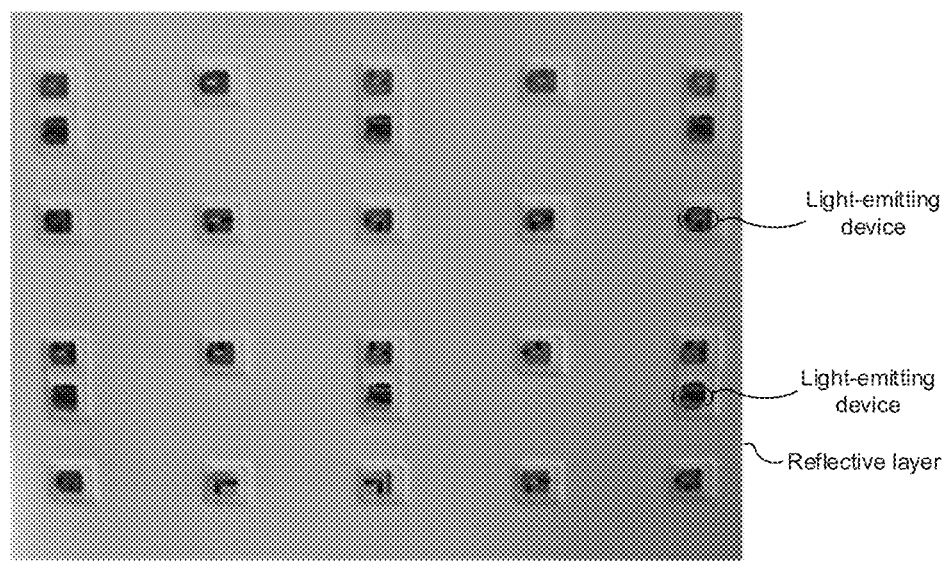
FIG. 6a is a partial structural diagram of a material object of a light-emitting substrate, in accordance with an implementation.
Figure 6B:
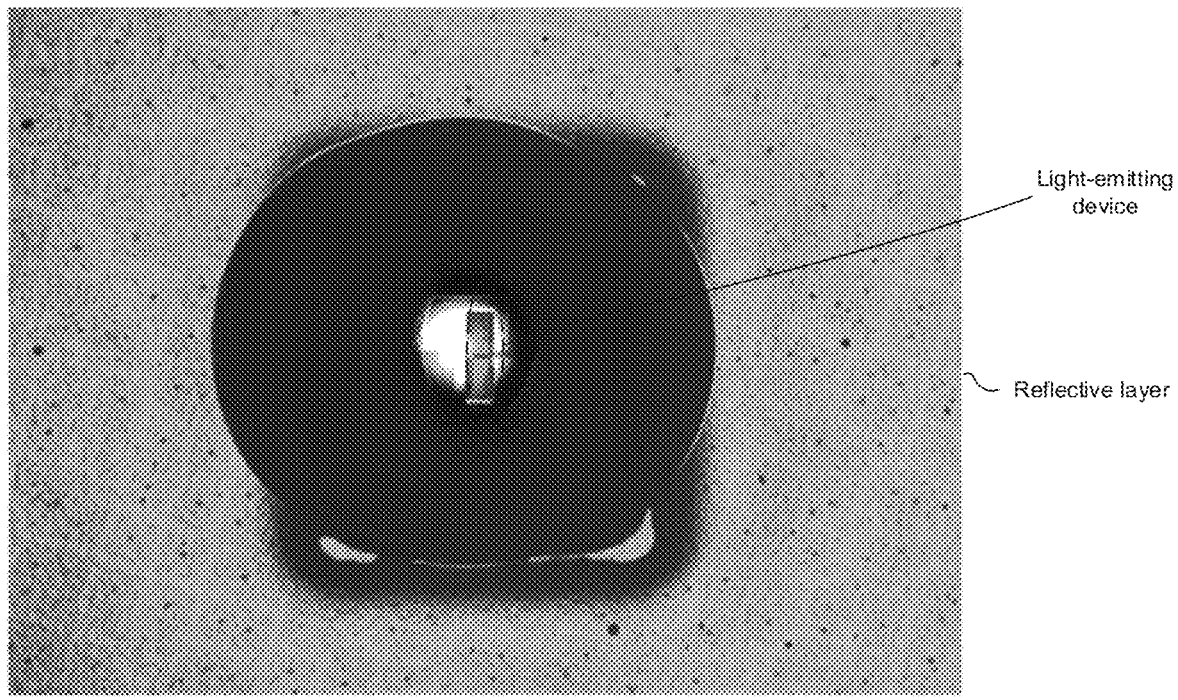
FIG. 6b is another partial structural diagram of a material object of a light-emitting substrate, in accordance with an implementation.

In an implementation, a thickness of the reflective layer is generally 55 μm. During a process of forming the reflective layer by silk-screen printing, a thickness of ink of single-layer silk-screen printing is relatively small. Thus, in order to reach a preset thickness of the reflective layer, it is generally necessary to perform the silk-screen printing process twice to form double-layer ink, and a schematic diagram showing the formed reflective layer and respective light-emitting devices is as shown in FIG. 6a. It can be seen that the reflective layer is in a shape of a step around a light-emitting device, a distance between the reflective layer and the light-emitting device is relatively large, and a manufacturing accuracy of the reflective layer is relatively low. In addition, as shown in FIG. 6b, an indentation in a shape of a grid may be observed on a surface of the reflective layer.

Figure 11A:
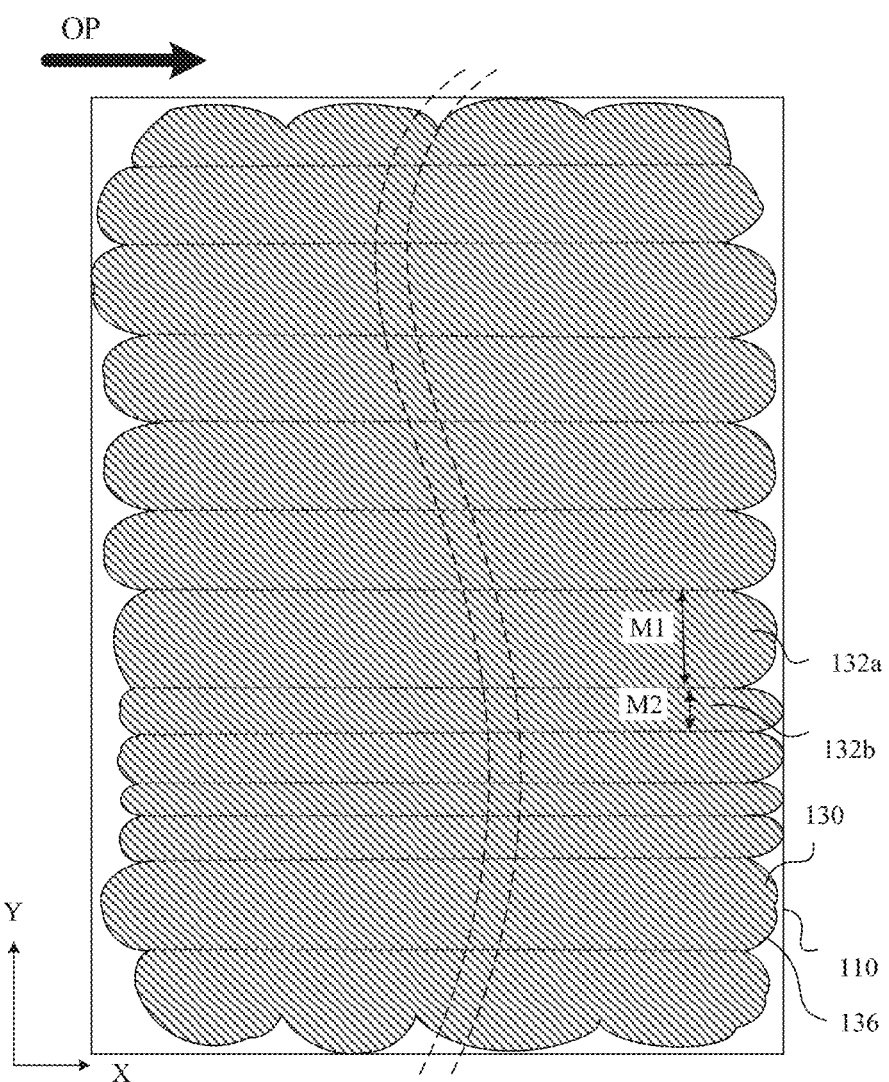
FIG. 11a is a diagram showing structures of a reflective layer and a substrate, in accordance with some embodiments of the present disclosure.
Figure 11B:
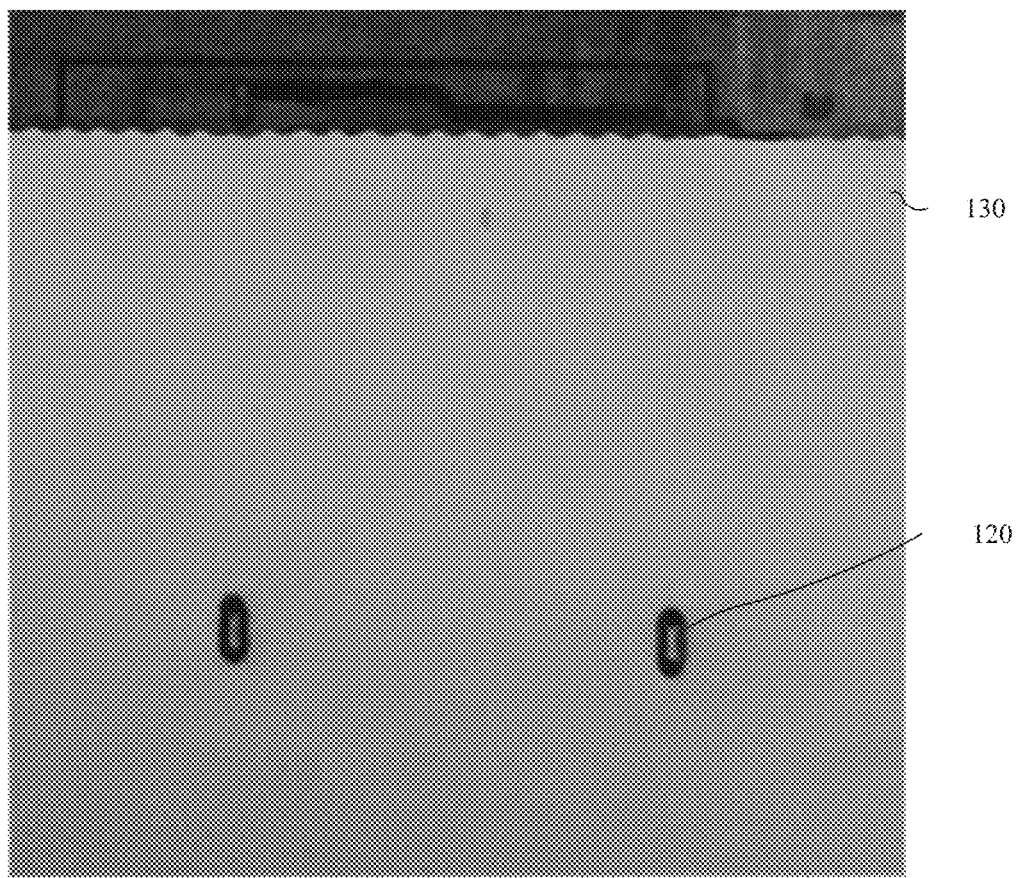

In the embodiments of the present disclosure, as shown in FIG. 11b, a thickness of printing by performing a 3D printing process one time may reach 55 μm, and the thickness of the printing one time is greater than that of printing by performing a silk-screen printing process one time. Thus, the reflective layer 130 may be formed one-step by 3D printing, which may improve an accuracy of the formed reflective layer 130 to a certain extent, so as to avoid both an increase after a superposition of errors in a dimension of the reflective layer, and a morphology feature, in a shape of a step, of the reflective layer that are caused by multi-time printing processes by silk-screen printing. As a result, the dimensional accuracy of the formed reflective layer 130 is further improved, and there is no indentation in a shape of a grid on the surface of the reflective layer 130 that is formed by 3D printing.

Figure 7:
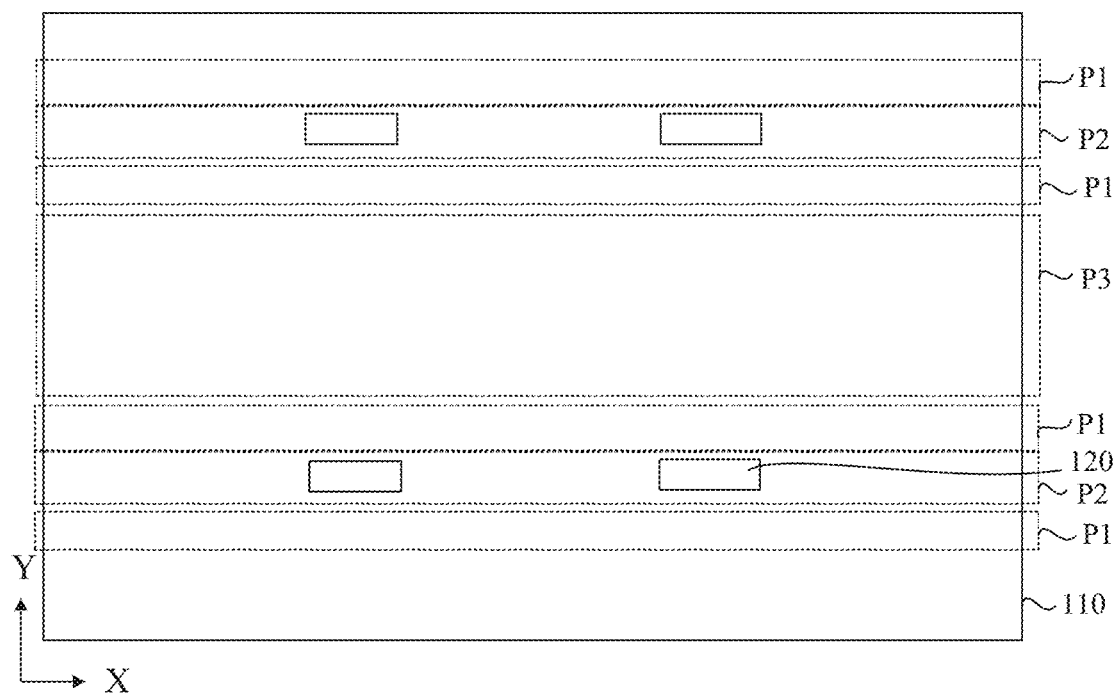
FIG. 7 is a structural diagram of a light-emitting substrate, in accordance with some other embodiments of the present disclosure.

In some embodiments, as shown in FIG. 7, the substrate 110 has a plurality of first printing regions P1, a plurality of second printing regions P2 and a plurality of third printing regions P3 each extending in the first direction X. The plurality of second printing regions P2 and the plurality of third printing regions P3 are alternately arranged, and any adjacent second printing region P2 and third printing region P3 are provided with a first printing region P1 therebetween. That is, there are two first printing regions P1 arranged on two opposite sides of each second printing region P2, and there are two first printing regions P1 arranged on two opposite sides of each third printing region P3.

For example, a row of light-emitting devices 120 are located in a second printing region P2. That is, a row of second light-emitting devices 120 correspond to a second printing region P2, and the plurality of rows of second light-emitting devices 120 and the plurality of second printing regions P2 are disposed in a one-to-one correspondence.

For example, the first printing regions P1, the second printing regions P2 and the third printing regions P3 that are all located on the substrate 110 may each extend in the second direction Y. In this case, it may be that a column of light-emitting devices 120 are located in a second printing region P2.

For convenience of description, the following description will be introduced by taking an example where the first printing regions P1, the second printing regions P2 and the third printing regions P3 each extend in the first direction X.

Figure 8A:
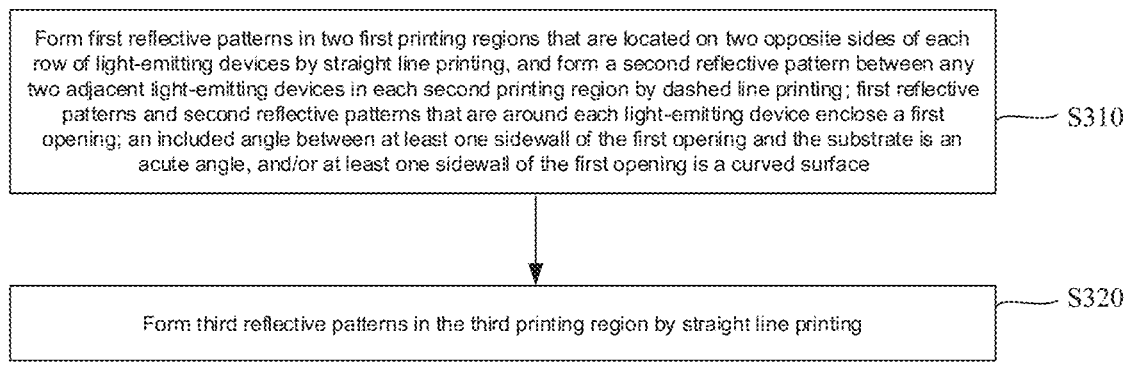
FIG. 8a is a diagram showing steps of a method of manufacturing a light-emitting substrate, in accordance with some other embodiments of the present disclosure.

In some embodiments, as shown in FIG. 8a, in S300 of the method, the process of forming the reflective layer 130 on the substrate 110 by 3D printing includes S310 to S320.

Figure 8B:
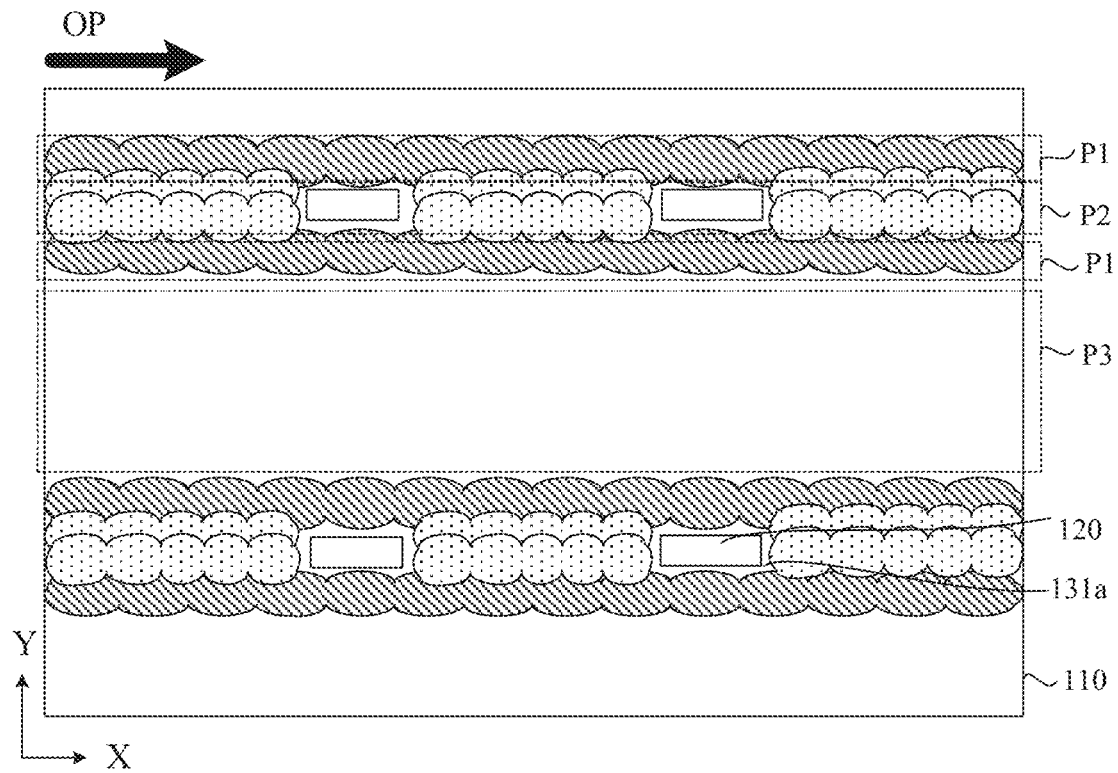
FIG. 8b is a diagram showing a process of manufacturing a light-emitting substrate, in accordance with some other embodiments of the present disclosure.
Figure 9:
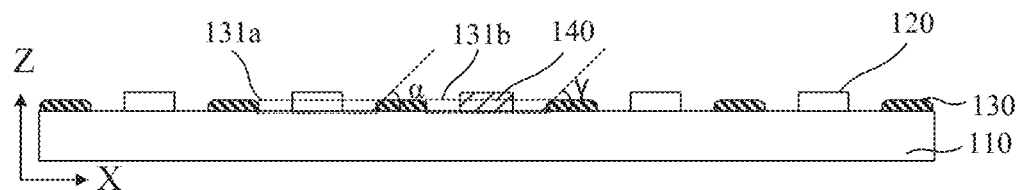
FIG. 9 is a structural diagram of a light-emitting substrate, in accordance with yet other embodiments of the present disclosure.

In S310, as shown in FIG. 8b, first reflective patterns are formed in two first printing regions P1 that are located on two opposite sides of each row of light-emitting devices 120 by straight line printing, and a second reflective pattern is formed between any two adjacent light-emitting devices 120 in each second printing region P2 by dashed line printing. First reflective patterns and second reflective patterns that are around each light-emitting device 120 enclose a first opening 131a. As shown in FIG. 9, an included angle α between at least one sidewall of the first opening 131a and the substrate 110 is an acute angle, and/or at least one sidewall of the first opening 131a is a curved surface.

For example, the first reflective pattern may include one or more printing bars, and thus an edge of the first reflective pattern is an edge of the printing bar(s). The second reflective pattern may include one or more printing bars, and thus an edge of the second reflective pattern is an edge of the printing bar(s).

It will be noted that, firstly, straight line printing refers to that, after the 3D printing device completes printing along the set printing path one time, a formed printing pattern is a printing bar that is continuous, uninterrupted and in a shape similar to a straight line, and the printing bar has a first protruding structure 132a; dashed line printing refers to that, after the 3D printing device completes printing along the set printing path one time by controlling the printing spray valve to achieve intermittent opening or closing, a formed printing pattern is a printing bar that is discontinuous, interrupted and in a shape similar to a dashed line, and the printing bar has a second protruding structure 132b. A printing bar corresponds to a protruding structure 132.

Figure 10A:
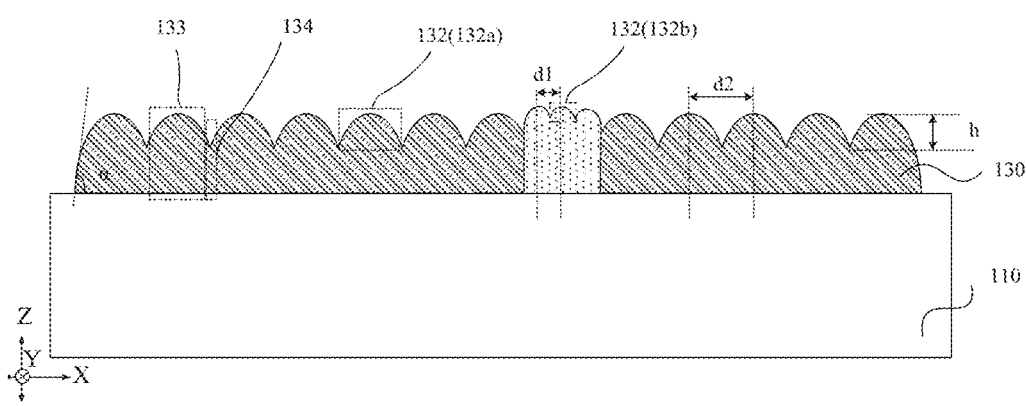
FIG. 10a is a diagram showing partial structures of a substrate and yet another reflective layer, in accordance with some embodiments of the present disclosure.

Next, as shown in FIG. 10a, a printing step size d1 of dashed line printing is less than or equal to a printing step size d2 of straight line printing. Here, the printing step size is a distance between center lines of two adjacent printing bars, which is actually a distance, i.e., a dimension of the protruding structure 132 in an arrangement direction thereof, that the 3D printing device moved in a direction perpendicular to the printing path after printing a printing bar. For example, the printing step size of straight line printing process is in a range from 0.1 mm to 3.0 mm, and the printing step size of dashed line printing is in a range from 0.1 mm to 1.5 mm. Therefore, a printing accuracy of dashed line printing is greater than a printing accuracy of straight line printing.

Figure 10B:
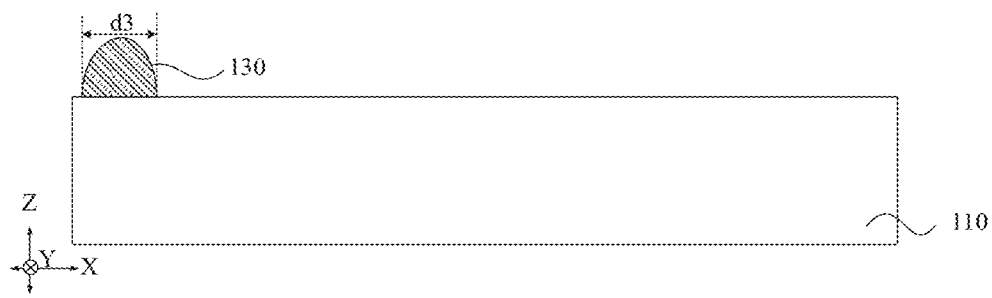
FIG. 10b is a diagram showing partial structures of a substrate and yet another reflective layer, in accordance with some embodiments of the present disclosure.

In addition, in an example where the printing spray valve completes printing once to form a printing bar, an overlapping width of two adjacent printing bars is equal to a difference between a width d3 of a printing bar and a printing step size. FIG. 10b is a schematic diagram showing the width of the printing bar. In the reflective layer 130, except for a portion on an edge, portions of two adjacent printing bars that are non-overlapping with each other constitute a first portion 133 of the reflective layer 130, and portions of the two adjacent printing bars overlapping with each other constitute a second portion 134 of the reflective layer 130.

For example, as shown in FIG. 10a, the second portion 134 is a portion of the reflective layer 130 having a smallest thickness. In the reflective layer 130, the first portions 133 and the second portions 134 are alternately arranged.

In some examples, a difference between a thickness of the first portion 133 and a thickness of the second portion 134 is less than or equal to 20 μm.

For example, the thickness of the first portion 133 in a different region varies. Here, the thickness of the first portion 133 refers to a maximum thickness of the first portion 133.

For example, the difference between the thickness of the first portion 133 and the thickness of the second portion 134 may be 20 μm, 18 μm, 15 μm, 10 μm, 8 μm or 6 μm.

In an example where an average thickness of the reflective layer 130 is 55 μm, with the above arrangement, the maximum thickness of the first portion 133 is approximately 65 μm, and the thickness of the second portion 134 is approximately 45 μm, so that a fluctuation in thicknesses to which different regions of the reflective layer 130 correspond may be relatively small. Therefore, it is possible to satisfy a requirement for the reflectivity of the reflective layer 130 and ensure the luminous efficiency of the light-emitting substrate 100.

In some other examples, the difference between the thickness of the first portion 133 and the thickness of the second portion 134 is less than or equal to 20% of a thickness of the reflective layer 130.

For example, the difference between the thickness of the first portion 133 and the thickness of the second portion 134 may be 20%, 18%, 15%, 10% or 8% of the thickness of the reflective layer 130.

With the above arrangement, a difference in the thicknesses to which the different regions of the reflective layer 130 correspond is relatively small, which may satisfy the requirement for the reflectivity of the reflective layer 130, so that the luminous efficiency of the light-emitting substrate 100 is not affected.

For example, as shown in FIG. 8b, a printing direction OP is the first direction X, and a first reflective pattern formed on a side proximate to a row of light-emitting devices 120 is a pattern that is continuous, uninterrupted and in a shape of a straight line. In the second printing region P2, dashed line printing is adopted, and the printing spray valve of the 3D printing device is set to be closed at positions corresponding to the light-emitting devices 120 and to be opened at remaining positions. Thus, second reflective patterns are disconnected in the first direction X, so that all of the second reflective patterns in the second printing region P2 are discontinuous, interrupted and in a shape of a dashed line as a whole.

For example, forming the first reflective patterns in the two first printing regions P1 that are located on the two opposite sides of each row of light-emitting devices 120 is limiting a dimension of the first opening 131a in the second direction Y is limited, a part of edges of the first reflective patterns constituting two opposite sidewalls of the first opening 131a; the second reflective patterns are used for limiting a dimension of the first opening 131a in the first direction X, and a part of edges of the second reflective patterns constitute other two opposite sidewalls of the first opening 131a.

For example, in the step S310, during the process of forming the first reflective patterns in the two first printing regions P1 that are located on the two opposite sides of each row of light-emitting devices 120, the first reflective patterns may be formed by dashed line printing. Since the printing accuracy of dashed line printing is greater than the printing accuracy of straight line printing, it is possible to improve an accuracy of the first opening 131a enclosed by the first reflective patterns and the second reflective patterns that are around each light-emitting device 120, so that the manufacturing accuracy of the reflective layer 130 may be improved.

For example, 3D printing is adopted, which makes the dimension of the reflective layer 130 that is formed by printing and the dimension of the first opening 131a both relatively accurate, so that a distance between an edge of the reflective layer 130 and the light-emitting device 120 may be made relatively small by controlling printing parameter(s). As a result, the proportion of the area, covered by the reflective layer 130, of the substrate 110 may be relatively large, so that the luminous efficiency of the light-emitting substrate 100 may be relatively high.

For example, the dripping of 3D printing is in the form of the dots, so that the edge of the first reflective pattern and the edge of the second reflective pattern are each in a shape of a curved line in a top view (as shown in FIG. 8b). Thus, a sidewall of the first opening 131a enclosed by a part of the edges of the first reflective patterns and a part of the edges of the second reflective patterns is in a shape of a curved line in a top view. In addition, the edge of the first reflective pattern and the edge of the second reflective pattern are each in a shape of a curved surface in a sectional view (as shown in FIG. 9), and thus one or more sidewalls of the first opening 131a enclosed by the part of the edges of the first reflective patterns and the part of the edges of the second reflective patterns are each in a shape of a curved surface.

For example, as shown in FIG. 9, an included angle between a sidewall of the first opening 131a and the substrate 110 is an acute angle. Alternatively, an included angle between each of two or more sidewalls of the first opening 131a and the substrate 110 is an acute angle.

For example, the included angle between the sidewall of the first opening 131a and the substrate 110 may be 30°, 50°, 60°, 65° or 70°.

For example, the shape of the first opening 131a in the top view may be a rectangle or a circle. In an example where the shape of the first opening 131a in the top view as shown in FIG. 3 is the rectangle, the first opening 131a has four sidewalls, and an included angle between each of one or more sidewalls of the first opening 131a and the substrate 110 is an acute angle. That is, the one or more sidewalls enclosing the first opening 131a each protrude towards a direction where a center of the first opening 131 is located. The rectangle or the circle is, for example, an irregular rectangle or an irregular circle, respectively.

For example, a magnitude of the included angle between the sidewall of the first opening 131a and the substrate 110 is related to material properties of the reflective layer 130. An included angle between a sidewall of a first opening 131a of a reflective layer 130 formed of a different reflective layer material and the substrate 110 may vary.

Figure 8C:
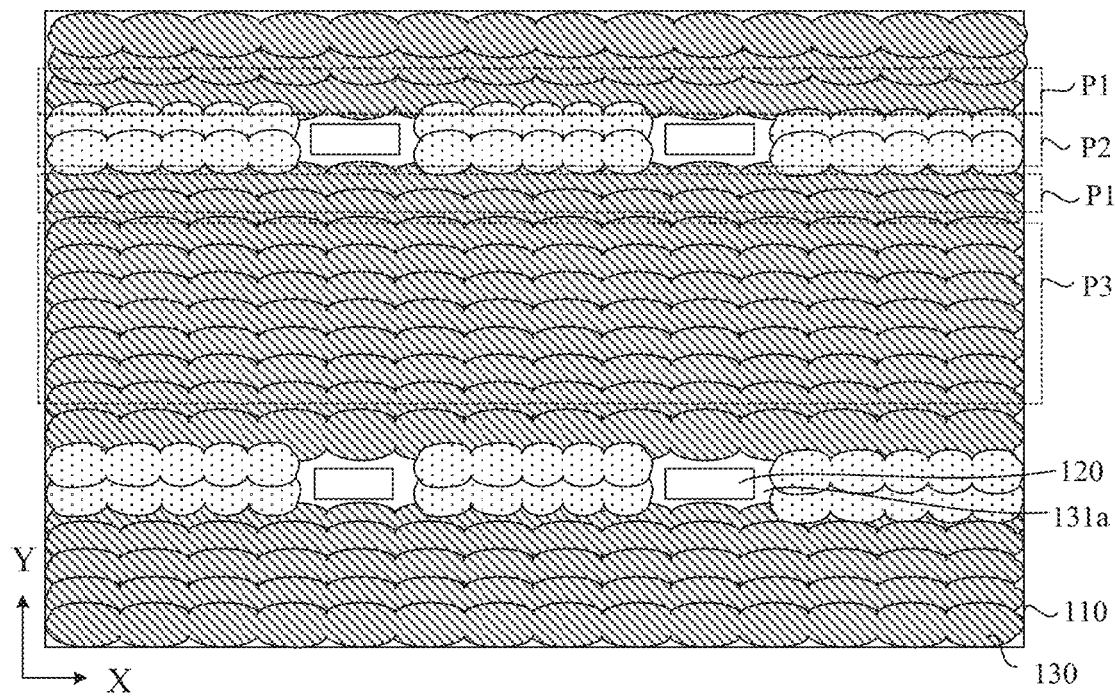
FIG. 8c is a diagram showing another process of manufacturing a light-emitting substrate, in accordance with some other embodiments of the present disclosure.

In S320, as shown in FIG. 8c, third reflective patterns are formed in the third printing region P3 by straight line printing.

For example, there is no device in the third printing regions P3 that needs to be exposed on the reflective layer 130, so that the third reflective patterns may be formed by straight line printing.

The printing step size d2 of straight line printing is greater than or equal to the printing step size d1 of dashed line printing. Therefore, with the above arrangement, a printing speed in the third printing region P3 may be improved, thereby improving a printing efficiency of the reflective layer 130.

In an implementation, as for the reflective layer of the light-emitting substrate formed by silk-screen printing, due to limitations of silk-screen printing, a distance between a sidewall of an opening of the formed reflective layer and a respective light-emitting device is approximately 0.5 mm. Even if the distance between the sidewall of the opening of the formed reflective layer and the respective light-emitting device is reduced to approximately 0.3 mm by subsequently performing the dot patching process additionally, there is still a gap between the light-emitting device and the sidewall of the respective opening, and a dimension of the gap is relatively large. Thus, a part of the light emitted from the light-emitting device will enter the gap, so that the reflectivity of the reflective layer is reduced. As a result, the display luminance of the backlight module and the display apparatus is reduced, and the power consumption of the backlight module and the display apparatus is improved.

In light of this, in some examples of the present disclosure, the reflective layer 130 is formed by 3D printing, so that a distance between a light-emitting device 120 and a sidewall of a respective first opening 131a is in a range from 0.05 mm to 0.3 mm.

For example, the distance between the light-emitting device 120 and the sidewall of the respective first opening 131*a* may be 0.30 mm, 0.23 mm, 0.18 mm, 0.12 mm or 0.05 mm.

By using the above arrangement, a gap between the light-emitting device 120 and the sidewall of the respective first opening 131*a* may be relatively small, which may ameliorate a loss of light caused by a fact that the light emitted from the light-emitting device 120 enters the gap between the light-emitting device 120 and the first opening 131*a*. As a result, it is possible to improve the reflectivity of the reflective layer 130 and the luminous efficiency of the light-emitting substrate 100, so that the power consumption of the backlight module 10 and the display apparatus 1 may be reduced.

For example, the edge of the reflective layer 130 that is manufactured in the above embodiments of the present disclosure presents unique morphology by 3D printing.

For example, as shown in FIG. 11*a*, an edge of an orthographic projection, on the substrate 110, of the reflective layer 130 includes a plurality of curved segments 136. Alternatively, edges of the orthographic projection, on the substrate 110, of the reflective layer 130 each include a plurality of curved segments 136.

For example, a curved segment of the plurality of curved segments may protrude towards a direction where an edge of the substrate 110 is located. Alternatively, the plurality of curved segments may each protrude towards the direction where the edge of the substrate 110 is located.

Two sides of two dashed lines, as a whole, in FIG. 11*a* each show a schematic diagram of a portion of the reflective layer 130 proximate to an edge, and FIG. 11*a* does not show the openings 131 of the reflective layer 130. FIG. 11*b* shows a partial diagram of a material object of the reflective layer 130 to which FIG. 11*a* corresponds.

In some embodiments, before S300 in which the reflective layer 130 is formed on the substrate 110 by 3D printing, the method of manufacturing the light-emitting substrate 100 further includes S210*a*.

Figure 12A:
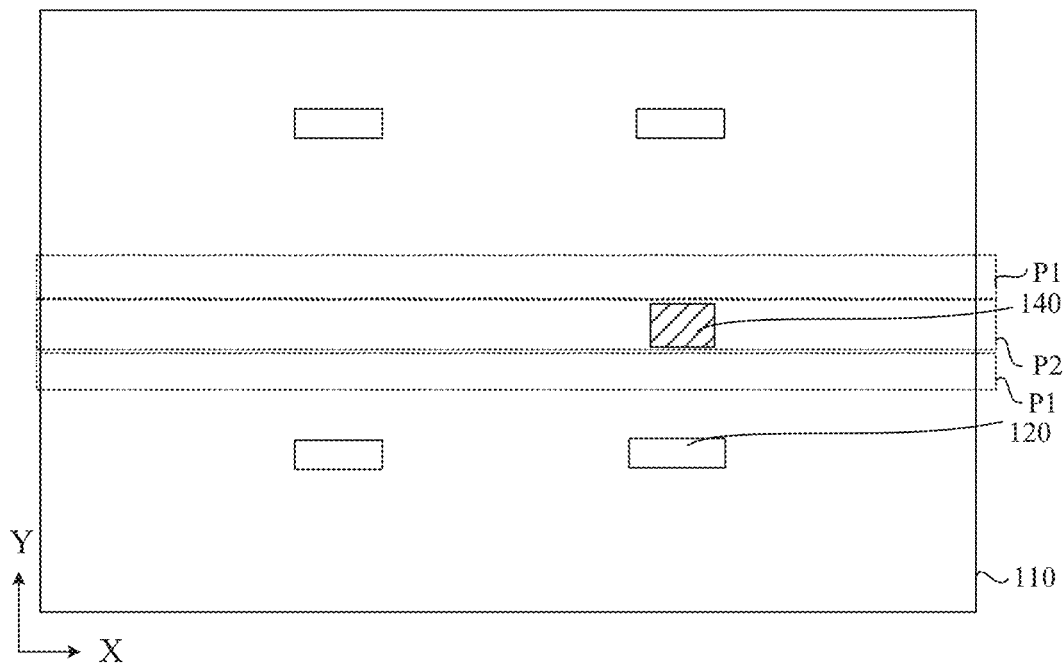
FIG. 12a is a structural diagram of a light-emitting substrate, in accordance with yet other embodiments of the present disclosure.

In S210*a*, as shown in FIG. 12*a*, a plurality of driving chips 140 are fixed on the substrate 110. The plurality of driving chips 140 are arranged in columns in the first direction X and in rows in the second direction Y. A row of driving chips 140 are located in a second printing region P2.

It will be noted that, for convenience of showing details of the subsequent manufacturing method, only one driving chip 140 is shown in FIG. 12*a*.

For example, the plurality of driving chips 140 and the plurality of light-emitting devices 120 are located on a same side of the substrate 110.

In some examples, a driving chip 140 is electrically connected to at least one light-emitting device 120, and the driving chip 140 is configured to drive the at least one light-emitting device 120 to emit light.

For example, the driving chip 140 may be electrically connected to a single light-emitting device 120 and drive the single light-emitting device 120 to emit light.

Figure 13:
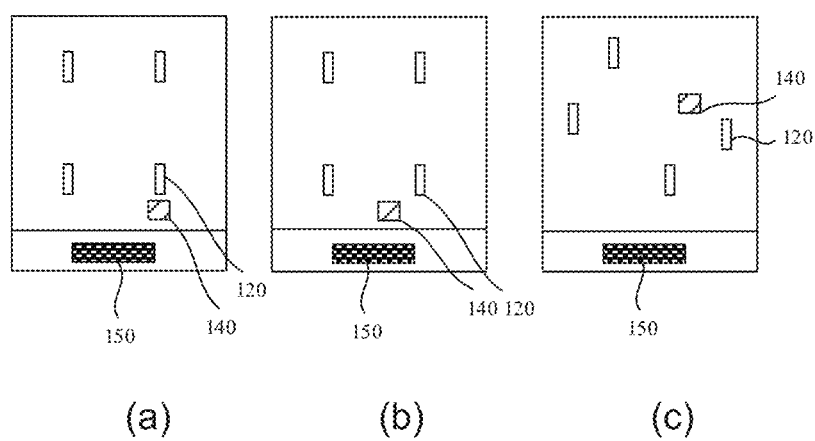
FIG. 13 are diagrams each showing a relative positional relationship between a driving chip and light-emitting devices, in accordance with some embodiments of the present disclosure.

For another example, as shown in FIG. 13, the driving chip 140 may be electrically connected to four light-emitting devices 120 and drive the four light-emitting devices 120 to emit light.

For yet another example, the driving chip 140 may be electrically connected to nine light-emitting devices 120 and drive the nine light-emitting devices 120 to emit light.

A description will be made by taking an example where the driving chip 140 drives four light-emitting devices 120.

A relative positional relationship among the driving chip 140 and the four light-emitting devices 120 by which the driving chip 140 drives varies, which may be set according to actual needs.

For example, as shown in FIG. 13, the four light-emitting devices driven by the driving chip 140 may be arranged in two rows and two columns. The driving chip 140 may be located directly below any column of light-emitting devices 120 (as shown in (a) in FIG. 13). Alternatively, the driving chip 140 may be located between two columns of light-emitting devices 120 (as shown in (b) in FIG. 13). Alternatively, the four light-emitting devices 120 are arranged in a staggered manner, and the driving chip 140 is randomly arranged at a position among the four light-emitting devices 120 (as shown in (c) in FIG. 13).

Hereinafter, a description below will be made by taking an example where the four light-emitting devices driven by the driving chip 140 are arranged in the two rows and the two columns, and the driving chip is located directly below the any column of light-emitting devices 120.

In some examples, the plurality of openings 131 of the reflective layer 130 further include a plurality of second openings 131*b*.

In some examples, in S300, the step of forming the reflective layer 130 on the substrate 110 by 3D printing further includes S330*a*.

Figure 12B:
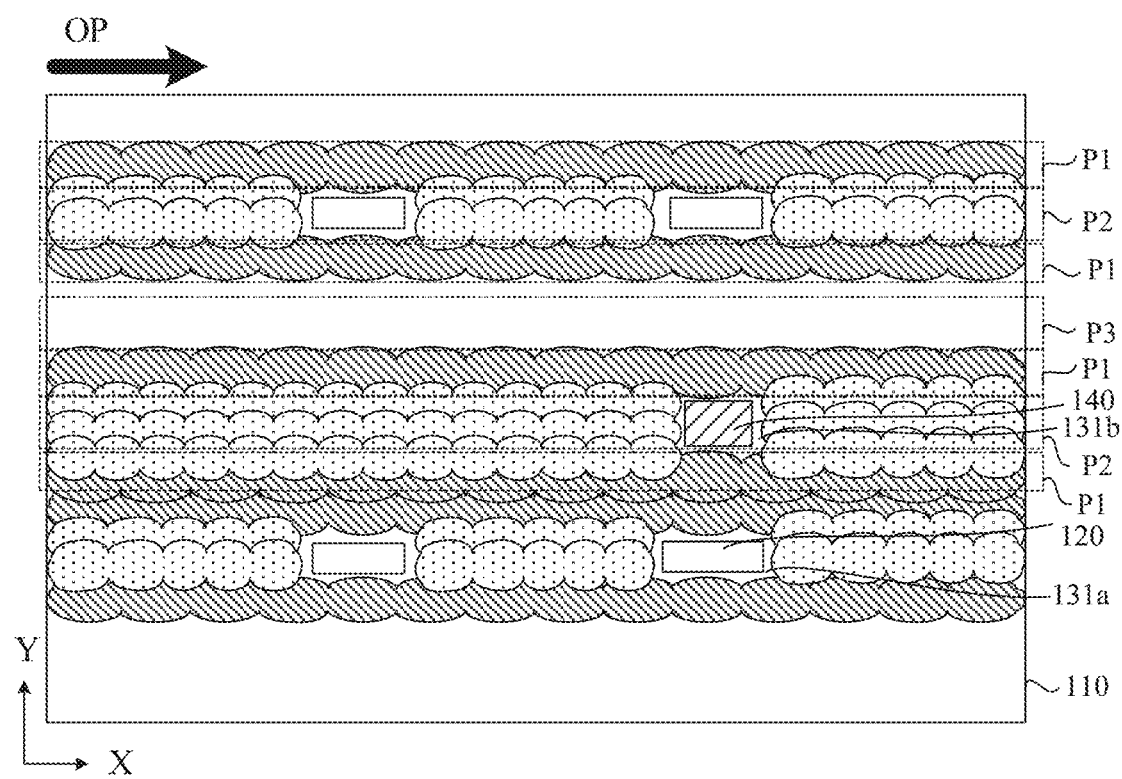
FIG. 12b is a diagram showing a process of manufacturing a light-emitting substrate, in accordance with yet other embodiments of the present disclosure.

In S330*a*, as shown in FIG. 12*b*, first reflective patterns are formed in two first printing regions P1 that are located on two opposite sides of each row of driving chips 140 by straight line printing, and a second reflective pattern is formed between any two adjacent driving chips 140 in each second printing region by dashed line printing. First reflective patterns and second reflective patterns that are around each driving chip 140 enclose a second opening 131*b*. As shown in FIG. 9, an included angle γ between at least one sidewall of the second opening 131*b* and the substrate 110 is an acute angle, and/or at least one sidewall of the second opening 131*b* is a curved surface.

It will be noted that, for convenience of showing details of the subsequent manufacturing method, only one driving chip 140 is shown in FIG. 12*b*.

In some examples, the plurality of driving chips 140 respectively correspond to the plurality of second openings 131*b*, and a driving chip 140 is located in a second opening 131*b*.

For example, a dimension of the first opening 131*a* is related to a dimension of the respective light-emitting device 120, and a dimension of the second opening 131*b* is related to a dimension of the respective driving chip 140. In a case where a dimension of a driving chip 140 is greater than a dimension of a light-emitting device 120, an area of an orthogonal projection of a respective second opening 131*b* on the substrate 110 may be greater than an area of an orthogonal projection of a respective first opening 131*a* on the substrate 110.

For example, a distance between a driving chip and a sidewall of a respective second opening 131*b* is in a range from 0.05 mm to 0.3 mm.

For example, the sidewalls of the first opening 131*a* and the sidewalls of the second opening 131*b* are each constituted by a part of edges of the first reflective patterns and a part of edges of the second reflective patterns, so that structural features of the first opening 131*a* may be the same as structural features of the second opening 131*b*. Reference may be made to the above description of the structural features of the first opening 131*a*, which will not be repeated here.

For example, in the step S330a, during the process of forming the first reflective patterns in the two first printing regions P1 that are located on the two opposite sides of each row of driving chips 140, dashed line printing may be adopted instead. The printing accuracy of dashed line printing is greater than the printing accuracy of straight line printing. In this way, it is possible to improve an accuracy of the second opening 131b enclosed by the first reflective patterns and the second reflective patterns that are around each driving chip 140.

For example, a corresponding relationship among the plurality of driving chips 140 and the second openings 131b of the reflective layer 130 varies, so that it is possible to manufacture the reflective layer 130 according to actual needs.

For example, in the above embodiments, the plurality of driving chips 140 respectively correspond to the plurality of second openings 131b, and a driving chip 140 is located in a second opening 131b. That is, the plurality of driving chips 140 are all exposed on the reflective layer 130.

For another example, in some other embodiments below, an orthographic projection, on the substrate 110, of at least one driving chip 140 of the plurality of driving chips 140 is located within an orthographic projection of the reflective layer 130 on the substrate 110. That is, the at least one driving chip 140 is covered by the reflective layer 130, and there is no second opening 131b at a respective position. In this way, it is possible to reduce the number of the second openings 131b of the reflective layer 130, so that the manufacturing process of the reflective layer 130 may be simplified.

In some other embodiments, before S300 in which the reflective layer 130 is formed on the substrate 110 by 3D printing, the method further includes S210b.

Figure 14A:
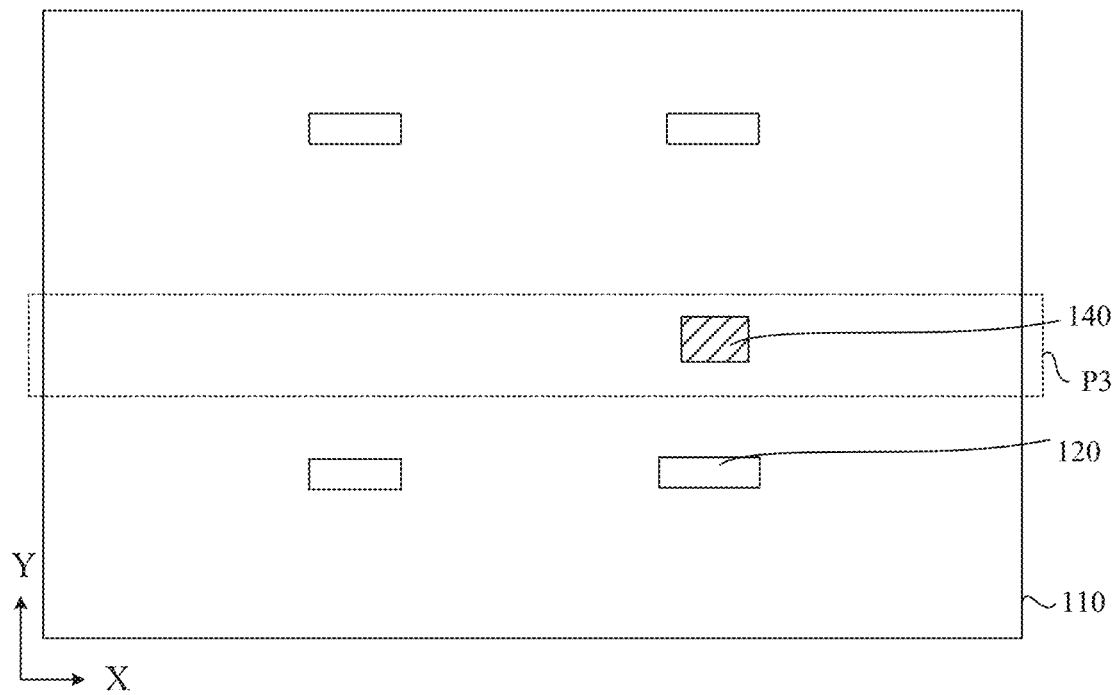
FIG. 14a is a structural diagram of a light-emitting substrate, in accordance with yet other embodiments of the present disclosure.

In S210b, as shown in FIG. 14a, a plurality of driving chips 140 are fixed on the substrate 110. The plurality of driving chips 140 are arranged in columns in the first direction X and in rows in the second direction Y. At least part of the plurality of driving chips 140 is located in the plurality of third printing regions P3.

For example, the plurality of driving chips 140 and the plurality of light-emitting devices 120 are located on a same side of the substrate 110.

In some examples, a driving chip 140 is electrically connected to at least one light-emitting device 120, and the driving chip 140 is configured to drive the at least one light-emitting device 120 to emit light.

For example, the driving chip 140 may be electrically connected to four light-emitting devices 120 and drive the light-emitting devices 120 to emit light.

For example, the plurality of openings 131 of the reflective layer 130 further include a plurality of second openings 131b.

In some examples, in S300, the step of forming the reflective layer 130 on the substrate 110 by 3D printing further includes S330b.

Figure 14B:
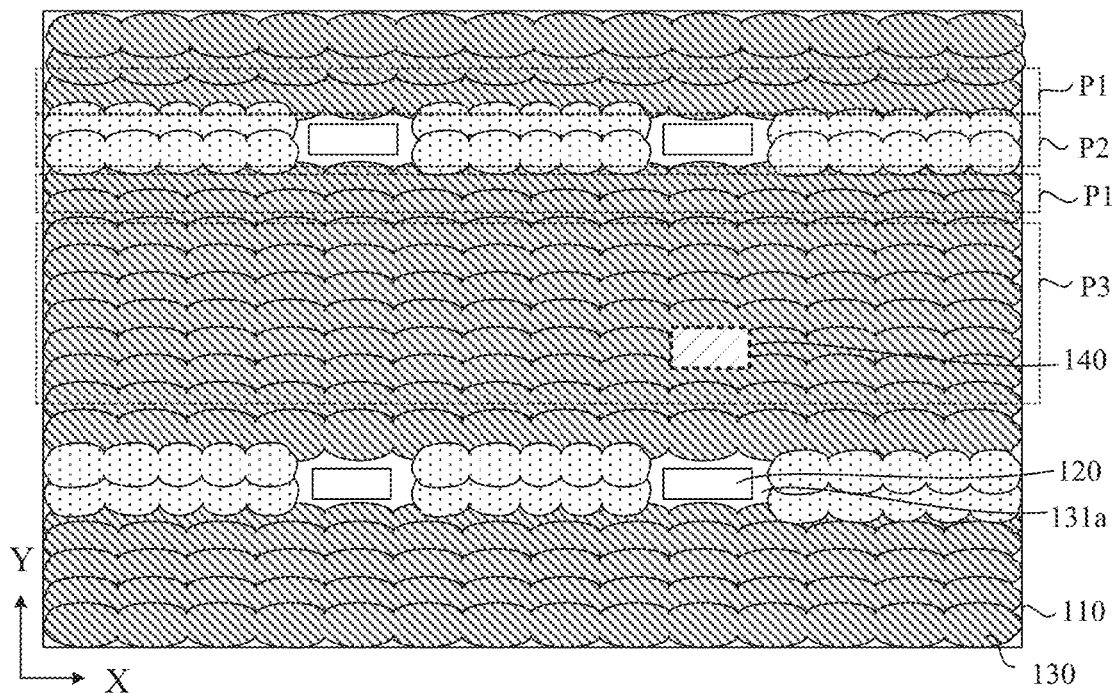
FIG. 14b is a diagram showing a process of manufacturing a light-emitting substrate, in accordance with yet other embodiments of the present disclosure.

In S330b, as shown in FIG. 14b, third reflective patterns are formed in the third printing regions P3 where the at least part of the plurality of driving chips 140 are located by straight line printing. Orthographic projections of the at least part of the plurality of driving chips 140 on the substrate 110 are located within orthographic projections of the third reflective patterns on the substrate 110.

For example, as shown in FIG. 14b, one or more driving chips 140 are covered by a pattern constituted by the third reflective patterns, so that the one or more driving chips 140 are not exposed on the reflective layer 130.

For example, orthographic projections of all the driving chips 140 on the substrate 110 are all located within the orthographic projections of the third reflective patterns on the substrate 110.

With the above arrangement, it is possible to simplify the manufacturing process of the reflective layer 130, reduce a design difficulty of the printing path of the printing spray valve and shorten time of forming, by 3D printing, the reflective layer 130. Furthermore, it is possible to improve a proportion of an area, occupied by the reflectively layer 130, of a plane where the substrate 110 is located, thereby improving the reflectivity, so as to improve the luminous efficiency of the light-emitting device 120. In addition, with the above arrangement, it is possible to improve an encapsulating effect for the at least one driving chip 140, so that an undesirable phenomenon such as corrosion or electric leakage of the driving chip 140 caused by a fact that moisture enters the driving chip 140 may be avoided.

It will be noted that, as for the 3D printing, the printing step size of straight line printing is greater than or equal to the printing step size of dashed line printing, so that the printing speed of dashed line printing is less than the printing speed of straight line printing. Therefore, time of performing the dashed line printing processes has a relatively large influence on overall printing time. Dashed line printing is adopted mainly for defining the dimensions of the openings 131. Thus, the less an area of printing by dashed line printing, the shorter the overall printing time, so that the printing efficiency is improved. Therefore, the time of printing the reflective layer 130 in the scheme in which all the driving chips 140 of the light-emitting substrate 100 are all covered by the reflective layer 130 (that is, the orthographic projections of all the driving chips 140 on the substrate 110 are all located within the orthographic projections of the third reflective patterns on the substrate 110) is much less than the time of printing the reflective layer 130 in the scheme in which the plurality of driving chips 140 respectively correspond to the plurality of second openings 131b, which shortens the time of printing by dashed line printing by approximately half, so that the printing efficiency may be improved by approximately 50%.

For example, the reflective layer 130 is formed by 3D printing, so that a relative morphology feature between a side surface or a top surface of the at least one driving chip 140 and the reflective layer 130 varies. Specifically, the morphology feature is related to the material of the reflective layer 130 and specific process parameters of 3D printing. Several situations will be described below, but the embodiments of the present disclosure are not limited to the following situations.

Figure 15A:
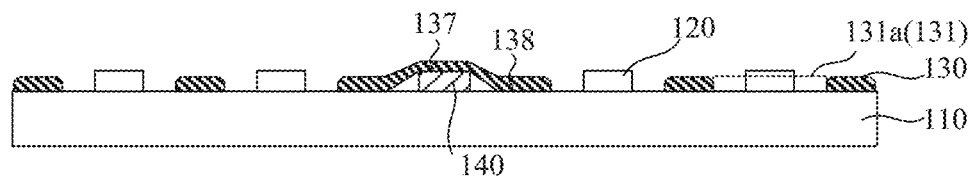
FIG. 15a is a structural diagram of a light-emitting substrate, in accordance with yet other embodiments of the present disclosure.

In some examples, as shown in FIG. 15a, a thickness of a portion 137, in contact with a top surface of at least one driving chip 140, of the reflective layer 130 is less than or equal to a thickness of a portion 138, in contact with the substrate 110, of the reflective layer 130.

For example, the thickness of the portion, in contact with the top surface of the at least one driving chip 140, of the reflective layer 130 is equal to the thickness of the portion, in contact with the substrate 110, of the reflective layer 130.

For another example, the thickness of the portion, in contact with the top surface of the at least one driving chip 140, of the reflective layer 130 is less than the thickness of the portion, in contact with the substrate 110, of the reflective layer 130.

During the process of forming, by straight line printing, the third reflective patterns in the third printing region P3 where the at least one driving chip 140 is located, the at least one driving chip 140 protrudes from the substrate 110 relative to other regions of the substrate 110, which causes the material of the reflective layer 130 printed on the top surface of the driving chip 140 to slowly flows to a position proximate to the side surface of the driving chip 140, so that the thickness of the reflective layer 130 on the top surface of the driving chip 140 is a little bit less than the thickness of the portion, in contact with the substrate 110, of the reflective layer 130.

Figure 15B:
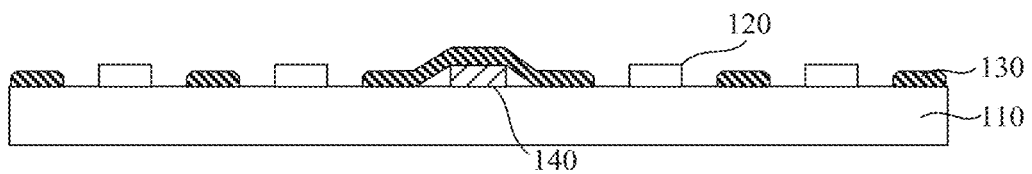
FIG. 15b is a structural diagram of a light-emitting substrate, in accordance with yet other embodiments of the present disclosure.

In some examples, as shown in FIGS. 15a and 15b, the side surface of the at least one driving chip 140 and the reflective layer 130 are provided with a gap therebetween.

For example, during a 3D printing process, there is a certain distance between the printing spray valve and the substrate 110 and between the printing spray valve and a preprinted surface such as the top surface or the side surface of the at least one driving chip 140, so that some gas will not overflow in time during a process that the material of the reflective layer ejected from the printing spray valve contacts the preprinted surface. Therefore, there is the gap between the side surface of the at least one driving chip 140 and the reflective layer 130.

Figure 15C:
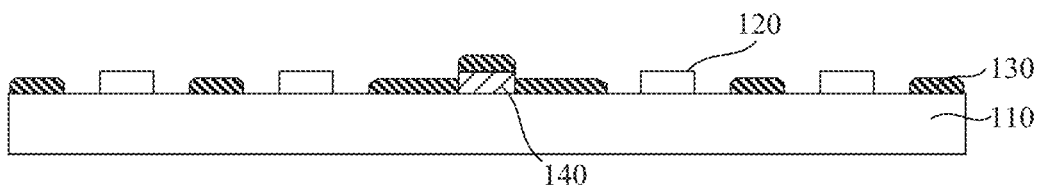
FIG. 15c is a structural diagram of a light-emitting substrate, in accordance with yet other embodiments of the present disclosure.

In some examples, as shown in FIG. 15c, the reflective layer 130 is discontinuous at the side surface of the at least one driving chip 140.

For example, a portion, in contact with the side surface of the at least one driving chip 140, of the reflective layer 130 and the portion, in contact with the top surface of the at least one driving chip 140, of the reflective layer 130 are not connected to each other.

It will be noted that, as for a light-emitting substrate 100 in a shape of a rectangle, the printing path of 3D printing is along a direction of a long side of the rectangle or a direction of a short side of the rectangle, which affects the printing efficiency of the reflective layer 130 to some extent. Specifically, the printing path may be preferably selected according to actual situations, so as to further improve the printing efficiency of the reflective layer 130.

For example, the number of the printing nozzles of the 3D printing device may be one or more. Here, the printing nozzles and the printing spray valves of the 3D printing device are disposed in one-to-one correspondence, and a printing nozzle corresponds to a printing spray valve, so that the number of the printing nozzles is equal to the number of the printing spray valves. In order to satisfy a production efficiency, the printing nozzle is generally designed to be of a multi-head structure, and the number of the printing nozzles needs to be designed to match the number of rows or columns of the openings 131 in the light-emitting substrate 100. For example, in a case where the numbers of rows and columns of the openings 131 in the light-emitting substrate 100 are 96 rows and 48 columns, respectively, the number of printing nozzles selected for dashed line printing may be 1, 2, 4, 8, 12, 24 or 48. The number of selected printing nozzles may be generally divisible by the number of rows or columns of the openings. The number of printing nozzles for straight line printing is not related to the number of rows and columns of the openings 131.

In some examples, as for 3D printing, a printing direction of straight line printing is the same as or perpendicular to a printing direction of dashed line printing.

For example, as shown in FIG. 12b, the printing direction of straight line printing is the first direction X, the printing direction of dashed line printing is also the first direction X, and thus the two are the same.

Figure 16:
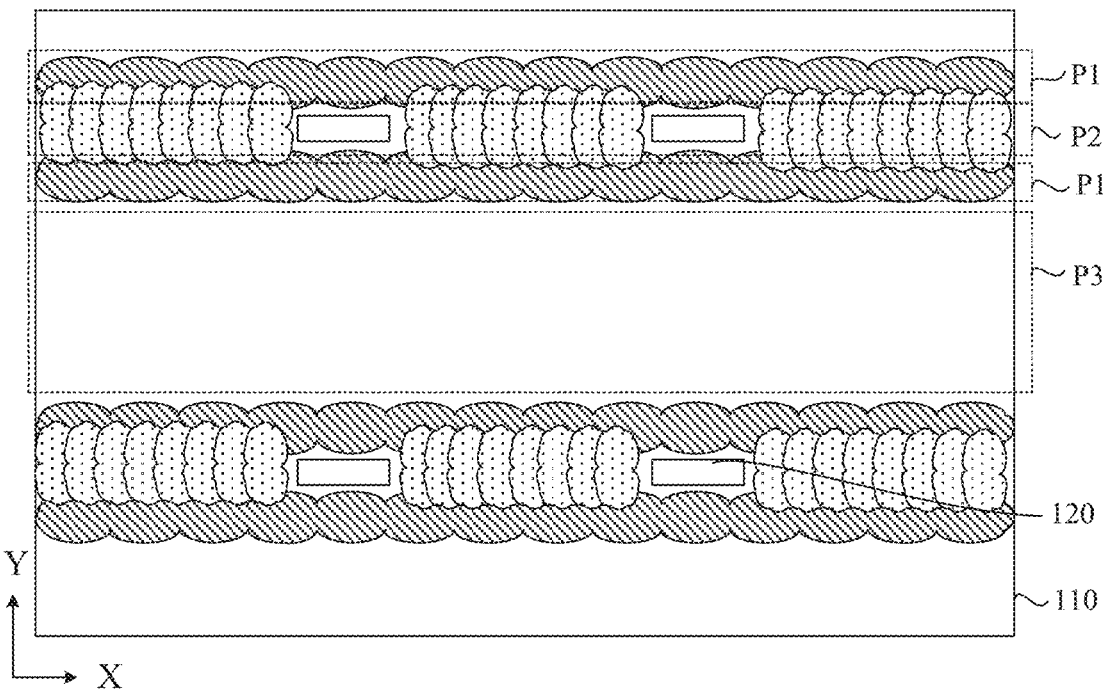
FIG. 16 is a diagram showing a process of manufacturing a light-emitting substrate, in accordance with yet other embodiments of the present disclosure.

For another example, as shown in FIG. 16, the printing direction of straight line printing is the first direction X, the printing direction of dashed line printing is the second direction Y, and thus the two are perpendicular to each other.

For example, the method of manufacturing the light-emitting substrate 100 further includes S400.

In S400, the light-emitting devices 120 are encapsulated.

Figure 22A:
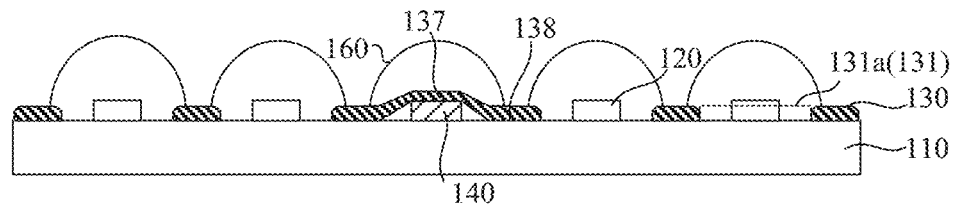
FIG. 22a is a structural diagram of a light-emitting substrate, in accordance with yet other embodiments of the present disclosure.
Figure 22B:
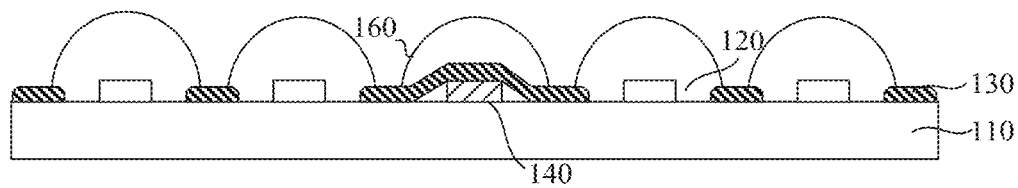
FIG. 22b is a structural diagram of a light-emitting substrate, in accordance with yet other embodiments of the present disclosure.
Figure 22C:
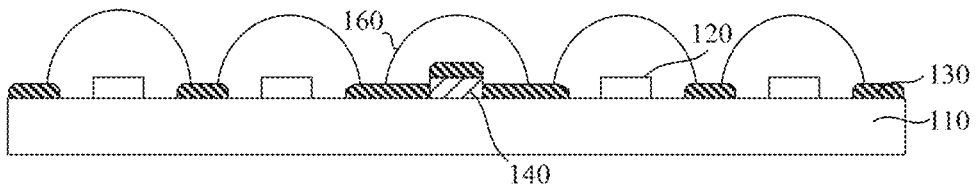
FIG. 22c is a structural diagram of a light-emitting substrate, in accordance with yet other embodiments of the present disclosure.

For example, as shown in FIGS. 22a to 22c, an encapsulation layer 160 may be formed, by using an encapsulation adhesive, to encapsulate the light-emitting devices 120, which may prevent the moisture from entering interiors of the light-emitting devices 120, so as to prevent luminescence of the light-emitting devices 120 from being affected.

For example, during the process of encapsulating the light-emitting devices 120, the driving chips 140 may be encapsulated. In this way, it is possible to avoid the problem of corrosion or electric leakage of the driving chip 140 caused by the fact that the moisture enters the driving chip 140, so that a yield of the driving chip 140 may be improved.

A method of calculating the printing time of the reflective layer 130 of the light-emitting substrate 100 in the embodiments of the present disclosure will be described below by taking examples.

It will be noted that, in the following examples, in order to improve the accuracies of the first opening 131a and the second opening 131b, for a first printing region P1 adjacent to a second printing region P2, dashed line printing is adopted.

The light-emitting substrate 100 includes two columns of light-emitting devices 120 and two columns of driving chips 140, and the number of the printing spray valves of the 3D printing device is 1. The printing process is performed in a second printing region and first printing regions that all correspond to a column of light-emitting devices 120 to form first openings 131a, and time of using the printing nozzle is a first working time T1. In a case where a column of driving chips 140 are each located in a respective second opening 131b, during a process that the printing is performed in a second printing region and first printing regions that all correspond to the column of driving chips 140, and the second openings 131b are formed, time of using the printing nozzle is a second working time T2.

For example, in a case where the two columns of driving chips 140 are located in third printing regions P3, time T of printing by dashed line printing is 2T1.

For example, in a case where a column of driving chips 140 are located in a third printing region P3, and the other column of driving chips are located in a second printing region P2, the time T of printing by dashed line printing is (2T1+T2).

For example, in a case where the two columns of driving chips 140 are located in second printing regions P2, the time T of printing by dashed line printing is (2T1+2T2).

Since T1 and T2 are each greater than 0, (2T1+2T2)>(2T1+T2)>2T1.

Thus, in the case where all the driving chips 140 are located in the third printing regions P3, the time of printing by dashed line printing is the smallest, which is conducive to improving the efficiency of forming the reflective layer 130 by 3D printing.

Figure 17A:
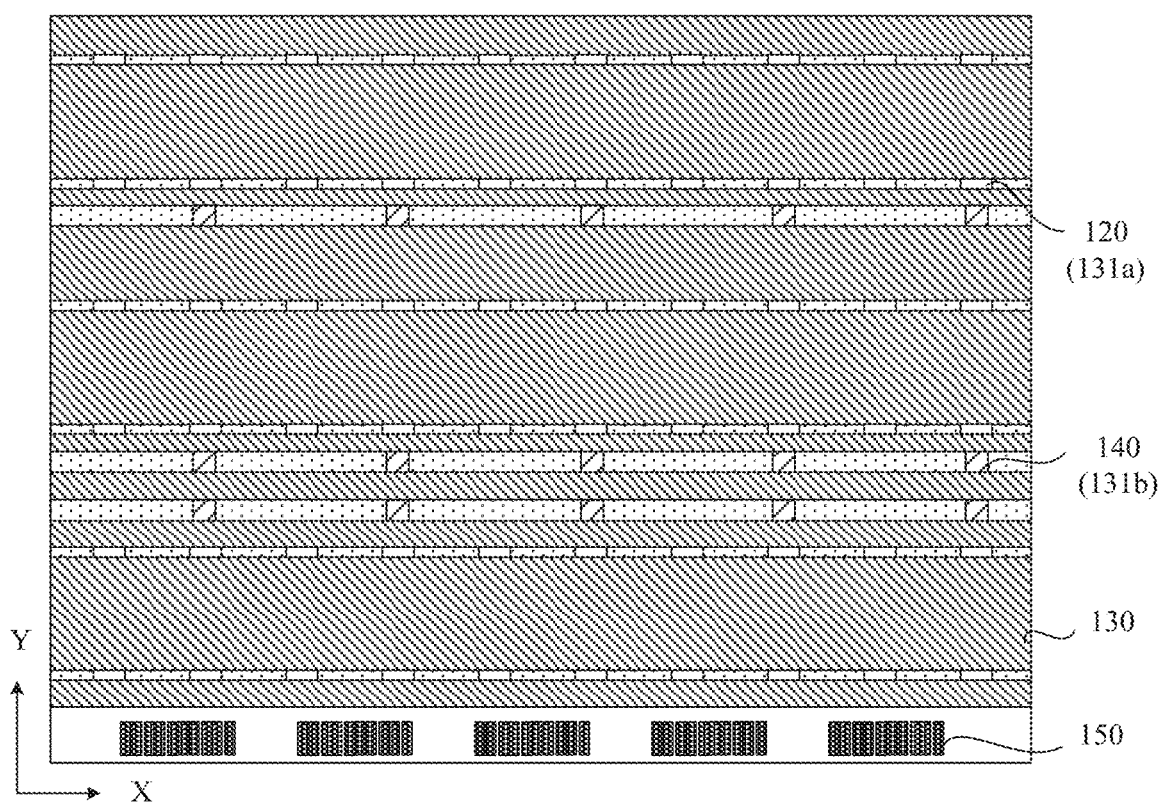
FIG. 17a is a structural diagram of a light-emitting substrate, in accordance with yet other embodiments of the present disclosure.
Figure 17B:
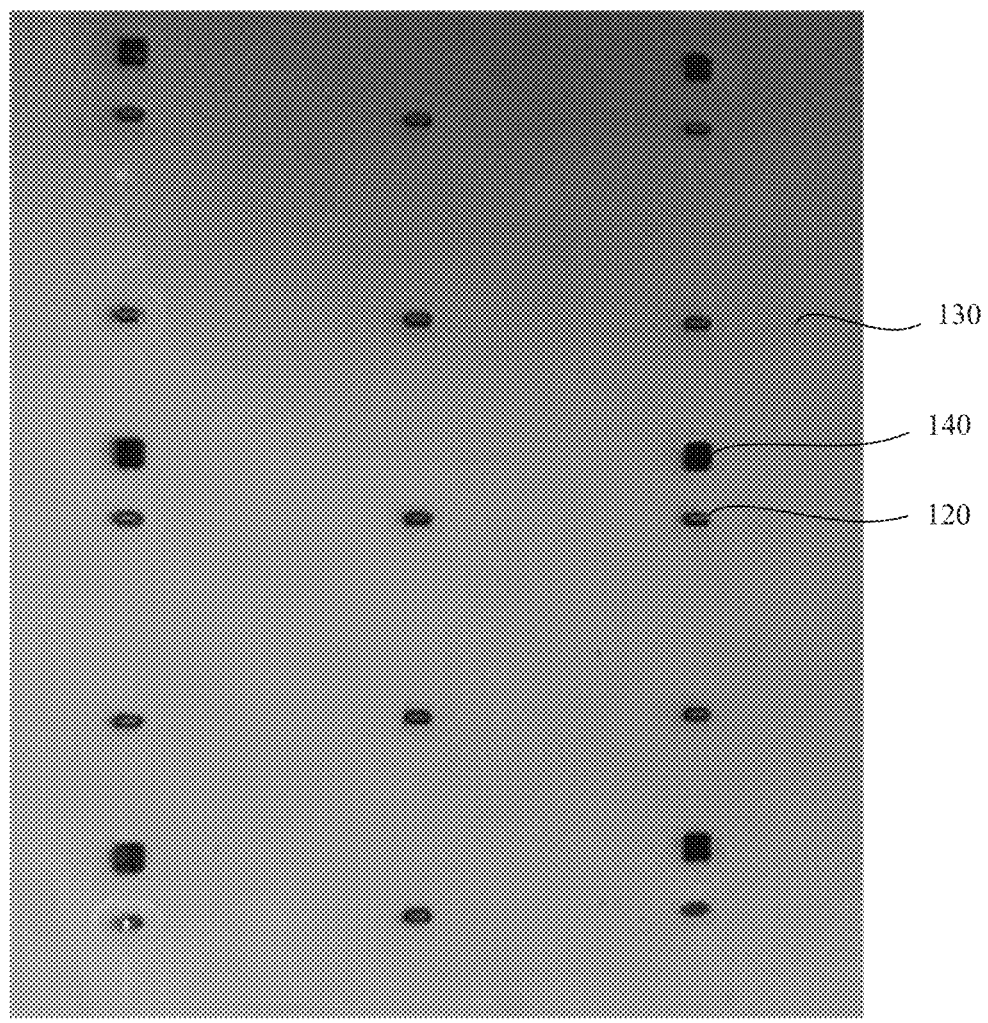

In addition, as shown in FIG. 17a, the size of the light-emitting substrate 100 is 802 mm*341 mm; the light-emitting devices 120 are arranged in 48 columns; the driving chips are arranged in 24 columns; the number of printing nozzles of dashed line printing is 24; the sizes of the light-emitting devices 120 are each 0.15 mm*0.51 mm; the sizes of the driving chips 140 are each 0.41 mm*0.41 mm; of dashed line printing, the printing speed is 100 mm/s, the invalid stroke is 500 mm, the printing step size of dashed line printing is 0.3 mm, the time of cycle column changing is 0.1 s, and the printing direction OP is the first direction X. In this case, it can be seen that time of printing of the printing nozzle one time is 13 s (which is specifically calculated by ((800+500)/100), a column of light-emitting devices 120 need to be printed in 4 times, and a column of driving chips 140 need to be printed in 5 times; during a process of printing first openings 131a corresponding to a column of light-emitting devices 120, the first working time T1 of the printing nozzle is 52.3 s (which is specifically calculated by (4*13+0.1*3); during a process of printing second openings 131b corresponding to a column of driving chips 140, the second working time T2 of the printing nozzle is 65.4 s (which is specifically calculated by (5*13+0.1*4)).

For example, in a case where the 24 columns of driving chips 140 are located in third printing regions P3, the time T of printing by dashed line printing is 2T1, which may be calculated to be 104.6 s.

For example, in a case where a column of driving chips 140 are located in a third printing region P3, and another column of driving chips 140 are located in a second printing region P2, the time T of printing by dashed line printing is (2T1+T2), which may be calculated to be 170 s.

For example, in a case where the 24 columns of driving chips 140 are located in second printing regions P2, the time T of printing by dashed line printing is (2T1+2T2), which may be calculated to be 235.4 s.

It can be seen that the time, in the case where all the driving chips 140 are located in the second printing regions P2, of printing by dashed line printing is more than twice the time, in the case where all the driving chips 140 are located in the third printing regions P3, of printing by dashed line printing. Thus, it is possible to greatly improve the efficiency of forming, by 3D printing, the reflective layer 130 by selecting an appropriate printing path and an appropriate printing method.

Some embodiments of the present disclosure provide a light-emitting substrate 100, and the light-emitting substrate 100 may be, for example, the light-emitting substrate manufactured by the manufacturing method as described in any one of the above embodiments.

A structure of the light-emitting substrate 100 will be described below.

In some embodiments, as shown in FIG. 3, the light-emitting substrate 100 includes a substrate 110, and a plurality of light-emitting devices 120 and a reflective layer 130 that are disposed on a side of the substrate 110.

For example, the substrate 110 may be a glass substrate, a PCB substrate or the like.

For example, as for structural features of the plurality of light-emitting devices 120, reference may be made to the description in the above embodiments herein, which will not be repeated here.

In some examples, the reflective layer 130 has a plurality of openings 131, and the plurality of openings 131 include a plurality of first openings 131a; a light-emitting device 120 is located in a first opening 131a.

For example, the first openings 131a are arranged correspondingly to the respective light-emitting devices 120.

For example, the light-emitting devices 120 are each located at a central position of a respective first opening 131a.

In some examples, a surface of the reflective layer 130 away from the substrate 110 has a plurality of protruding structures 132.

For example, the reflective layer 130 may be formed by 3D printing as described in any one of the above embodiments, so that the surface of the reflective layer 130 has the plurality of protruding structures 132.

Beneficial effects that may be achieved by the light-emitting substrate 100 provided in some embodiments of the present disclosure are the same as beneficial effects that may be achieved by the method of manufacturing the light-emitting substrate 100 provided in the above embodiments, which will not be repeated here.

Figure 18A:
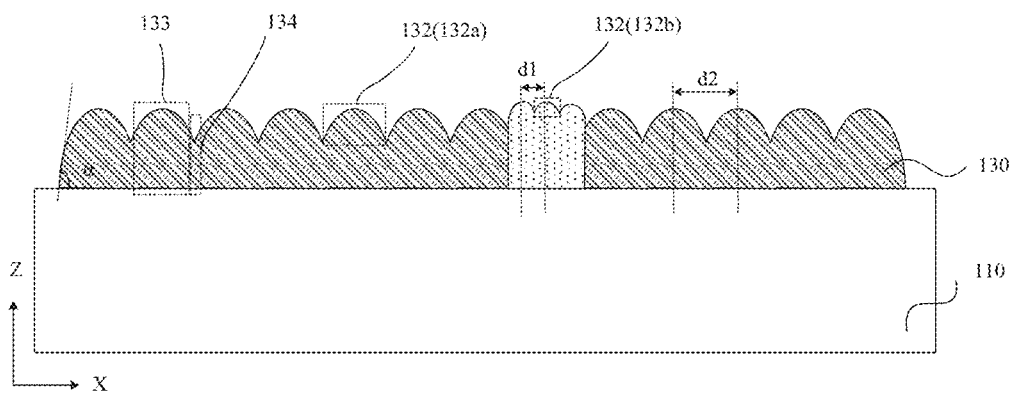
FIG. 18a is a structural diagram of a light-emitting substrate, in accordance with yet other embodiments of the present disclosure.

In some embodiments, as shown in FIG. 18a, the reflective layer 130 includes a plurality of first portions 133 and a plurality of second portions 134, a first portion 133 is a portion, corresponding to a protruding structure 132, of the reflective layer 130, and a second portion 134 is a portion, located between two adjacent protruding structures 132, of the reflective layer 130.

For example, the second portion 134 is a portion of the reflective layer 130 having a smallest thickness. In the reflective layer 130, the first portions 133 and the second portions 134 are alternately arranged.

In some examples, a difference between a thickness of the first portion 133 and a thickness of the second portion 134 is less than or equal to 20 µm.

For example, the thickness of the first portion 133 in a different region varies. Here, the thickness of the first portion 133 refers to a maximum thickness or an average thickness of the first portion 133.

For example, the difference between the thickness of the first portion 133 and the thickness of the second portion 134 may be 20 µm, 18 µm, 15 µm, 10 µm, 8 µm or 6 µm.

In an example where an average thickness of the reflective layer 130 is 55 µm, with the above arrangement, the maximum thickness of the first portion 133 is approximately 65 µm, and the thickness of the second portion 134 is approximately 45 µm, so that a fluctuation in thicknesses to which different regions of the reflective layer 130 correspond is relatively small. Therefore, it is possible to satisfy a requirement for a reflectivity of the reflective layer 130, so that a luminous efficiency of the light-emitting substrate 100 is ensured.

In some other examples, the difference between the thickness of the first portion 133 and the thickness of the second portion 134 is less than or equal to 20% of a thickness of the reflective layer 130.

Here, the thickness of the reflective layer refers to, for example, an average thickness of the entire reflective layer.

For example, the difference between the thickness of the first portion 133 and the thickness of the second portion 134 may be 20%, 18%, 15%, 10% or 8% of the thickness of the reflective layer 130.

With the above arrangement, a difference in the thicknesses to which the different regions of the reflective layer 130 correspond is relatively small, which may satisfy the requirement for the reflectivity of the reflective layer 130, so that the luminous efficiency of the light-emitting substrate 100 is prevented from being affected.

In yet other examples, the difference between the thickness of the first portion 133 and the thickness of the second portion 134 is less than or equal to 20 µm, and the difference between the thickness of the first portion and the thickness of the second portion is less than or equal to 20% of the thickness of the reflective layer 130.

With the above arrangement, it is possible to further ensure the difference in the thicknesses to which the different regions of the reflective layer 130 correspond to be relatively small, which may satisfy the requirement for the reflectivity of the reflective layer 130, so that the luminous efficiency of the light-emitting substrate 100 is prevented from being affected.

Figure 19:
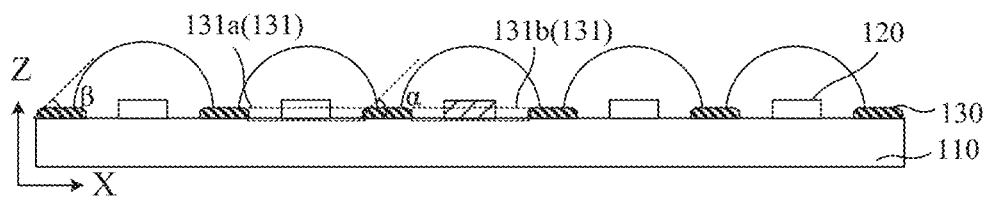
FIG. 19 is a structural diagram of a light-emitting substrate, in accordance with yet other embodiments of the present disclosure.

In some examples, as shown in FIG. 19, at least one sidewall of the opening 131 is in a shape of a curved surface.

For example, one or more sidewalls of the opening 131 are each in a shape of a curved surface.

For example, the opening 131 is enclosed by a part of edges of first reflective patterns and a part of edges of second reflective patterns, so that the at least one sidewall of the opening 131 is in the shape of the curved surface.

With the above arrangement, in a case where light emitted from the light-emitting device 120 is incident on a sidewall of the first opening 131a, the light is reflected at the sidewall and exits substantially in a light exit direction of the light-emitting substrate 100, which avoids a loss of light, so that the luminous efficiency of the light-emitting substrate 100 is improved.

In some embodiments, as shown in FIG. 19, a distance between a light-emitting device 120 and a sidewall of a respective first opening 131a is in a range from 0.05 mm to 0.3 mm.

For example, the distance between the light-emitting device 120 and the sidewall of the respective first opening 131a may be 0.30 mm, 0.22 mm, 0.17 mm, 0.08 mm or 0.05 mm.

With the above arrangement, the distance between the light-emitting device 120 and the sidewall of the respective first opening 131a may be relatively small, which may ameliorate a loss of light caused by a fact that light emitted from the light-emitting device 120 enters a region between the light-emitting device and the first opening. As a result, it is possible to improve the reflectivity of the reflective layer 130 and the luminous efficiency of the light-emitting substrate 100, so that the power consumption of the backlight module 10 and the display apparatus 1 may be reduced.

In some embodiments, as shown in FIG. 19, an included angle α between at least one sidewall of the first opening 131a and the substrate 110 is an acute angle.

For example, an included angle between a sidewall of the first opening 131a and the substrate 110 is an acute angle. Alternatively, an included angle between each of two or more sidewalls of the first opening 131a and the substrate 110 is an acute angle.

For example, a shape of the first opening 131a in a top view may be a rectangle or a circle. In an example where the shape of the first opening 131a in the top view as shown in FIG. 3 is the rectangle, the first opening 131a has four sidewalls, and an included angle between each of one or more sidewalls of the first opening 131a and the substrate 110 is an acute angle. That is, the one or more sidewalls enclosing the first opening 131a each protrude towards a center of the opening.

With the above arrangement, in the case where the light emitted from the light-emitting device 120 is incident on the sidewall of the first opening 131a, the light is reflected at the sidewall and exits substantially in the light exit direction of the light-emitting substrate 100, which avoids the loss of light, so that the luminous efficiency of the light-emitting substrate 100 is improved.

In some embodiments, as shown in FIG. 18a, a surface of a protruding structure 132 away from the substrate 110 is in a shape of a cambered surface.

For example, the cambered surface protrudes towards a direction away from the substrate 110.

With the above arrangement, a uniformity of light emitted from the reflective layer 130 may be improved.

It will be noted that an extending direction and an arrangement manner of the protruding structure 132 are both mainly determined by a printing path of 3D printing.

For example, in a case where a printing direction OP of the printing path of 3D printing is the first direction X, the plurality of protruding structures 132 each extend in the first direction X and are arranged in a plurality of rows in the second direction Y.

Figure 18B:
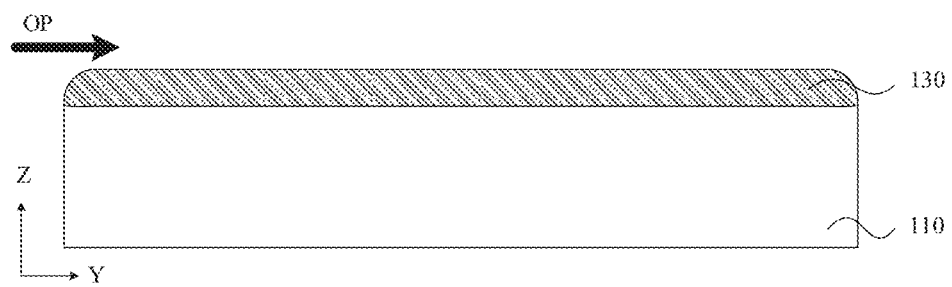
FIG. 18b is a structural diagram of a light-emitting substrate, in accordance with yet other embodiments of the present disclosure.

For example, as shown in FIGS. 18a and 18b, in a case where the printing direction OP of the printing path of 3D printing is the second direction Y, the plurality of protruding structures 132 each extend in the second direction Y and are arranged in a plurality of columns in the first direction X.

In some examples, as shown in FIG. 18a, the plurality of protruding structures 132 include a plurality of first protruding structures 132a and a plurality of second protruding structures 132b.

For example, extending directions and arrangement manners of the plurality of first protruding structures 132a and the plurality of second protruding structures 132b vary.

For example, as shown in FIG. 18a, the extending direction of the plurality of first protruding structures 132a and the extending direction of the plurality of second protruding structures 132b may be the same. The plurality of first protruding structures 132a may each extend in the second direction Y and are arranged in columns in the first direction X, and the plurality of second protruding structures 132b may each extend in the second direction Y and arranged in other columns in the first direction X.

For another example, the extending direction of the plurality of first protruding structures 132a and the extending direction of the plurality of second protruding structures 132b may be different. The plurality of first protruding structures 132a may each extend in the first direction X and are arranged in multiple rows in the second direction Y, and the plurality of second protruding structures 132b may each extend in the second direction Y and arranged in multiple columns in the first direction X.

In some examples, a dimension M1, in a direction where the plurality of first protruding structures 132a are arranged, of a first protruding structure 132a is greater than or equal to a dimension M2, in a direction where the plurality of second protruding structures 132b are arranged, of a second protruding structure 132b.

Figure 20:
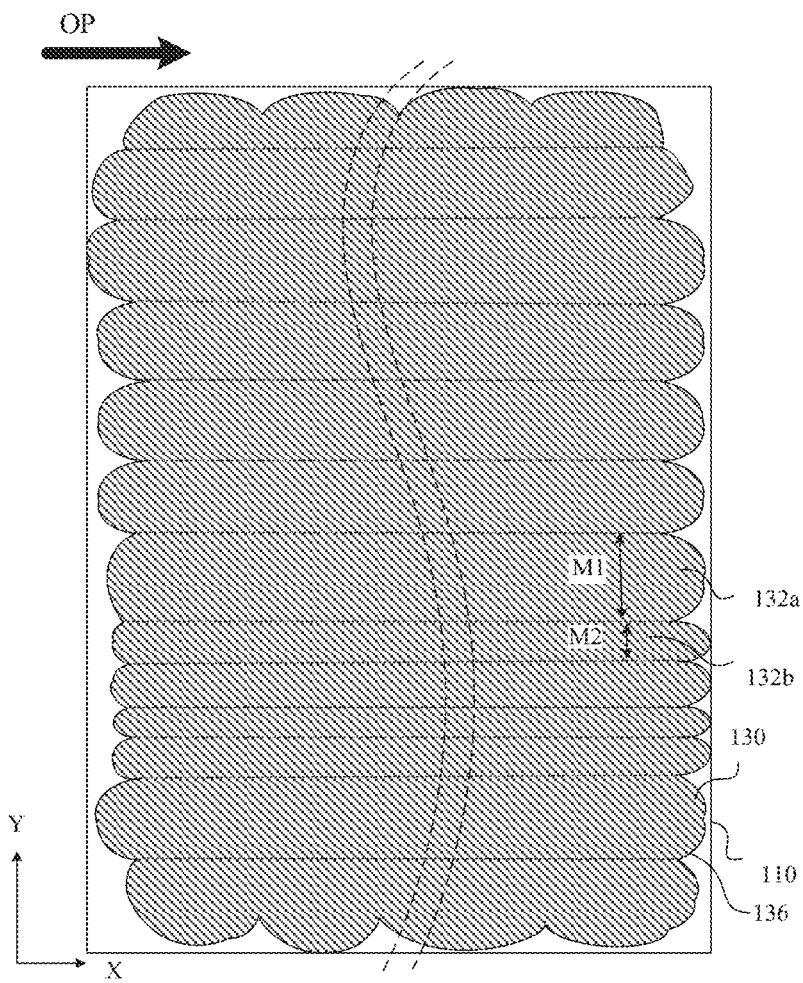
FIG. 20 is a diagram showing structures of a reflective layer and a substrate, in accordance with some other embodiments of the present disclosure.

For example, as shown in FIG. 20, in an example where the extending direction of the first protruding structures 132a and the extending direction of the second protruding structures 132b are both the first direction X, the first protruding structures 132a and the second protruding structures 132b are both arranged in the second direction Y, and the dimension M1 of the first protruding structure 132a in the second direction Y is greater than or equal to the dimension M2 of the second protruding structure 132b in the second direction Y.

During a process of forming the reflective layer 130 by 3D printing, every time a 3D printing device prints a printing bar, a protruding structure 132 may be formed. The dimension of the first protruding structure 132a in the arrangement direction thereof is relatively large. Thus, it is possible to reduce the number of printing bars, so that an efficiency of 3D printing may be improved. Moreover, the dimension of the second protruding structure 132b in the arrangement direction thereof is relatively small, so that it is possible to form, by the printing, the second protruding structure 132b on an edge of the reflective layer 130 or a periphery of an opening 131. As a result, it is possible to accurately control a dimensional accuracy of the formed reflective layer 130, so that an accuracy of forming, by 3D printing, the reflective layer 130 may be improved.

In addition, the number of the plurality of first protruding structures 132a formed by the printing may be greater than the number of the plurality of second protruding structures 132b formed by the printing. Thus, it is possible to further reduce the number of printing bars, so that an efficiency of forming, by 3D printing, the reflective layer 130 may be improved.

In some examples, as shown in FIG. 20, at least one edge of an orthographic projection, on the substrate 110, of the reflective layer 130 includes a plurality of curved segment 136, and at least one curved segment 136 protrudes towards a direction where an edge of the substrate 110 is located.

Two sides of two dashed lines, as a whole, in FIG. 20 each show a schematic diagram of a portion of the reflective layer 130 proximate to an edge, and FIG. 20 does not show the openings 131 of the reflective layer 130.

For example, an edge of the orthographic projection, on the substrate 110, of the reflective layer 130 includes the plurality of curved segment. Alternatively, edges of the orthographic projection, on the substrate 110, of the reflective layer 130 each include the plurality of curved segments.

For example, a curved segment of the plurality of curved segments may protrude towards the direction where the edge of the substrate 110 is located. Alternatively, the plurality of curved segments may each protrude towards the direction where the edge of the substrate 110 is located.

With the above arrangement, in a case where the light emitted from the light-emitting device 120 is incident on the edge of the reflective layer 130, the light is reflected at the edge and exits substantially in the light exit direction of the light-emitting substrate 100, which avoids the loss of light, so that the luminous efficiency of the light-emitting substrate 100 is improved.

In some examples, as shown in FIG. 19, an included angle β between at least one side surface, proximate to the edge of the substrate 110, of the reflective layer 130 and the substrate 110 is an acute angle.

For example, an included angle between a side surface, proximate to the edge of the substrate 110, of the reflective layer 130 and the substrate 110 is an acute angle.

For another example, an included angle between each of multiple side surfaces, proximate to the edge of the substrate 110, of the reflective layer 130 and the substrate 110 is an acute angle.

For example, the included angle between the at least one side surface, proximate to the edge of the substrate 110, of the reflective layer 130 and the substrate 110 is 30°, 50°, 60°, 70° or 80°.

For example, the included angle β between the side surface, proximate to the edge of the substrate 110, of the reflective layer 130 and the substrate 110 and the included angle α between the sidewall of the first opening 131a and the substrate 110 may be the same or different.

With the above arrangement, in a case where the light emitted from the light-emitting device 120 is incident on the side surface of the reflective layer 130, the light is reflected at the side surface and exits substantially in the light exit direction of the light-emitting substrate 100, which avoids the loss of light, so that the luminous efficiency of the light-emitting substrate 100 is improved.

In some embodiments, as shown in FIG. 17a, the light-emitting substrate 100 further includes a plurality of driving chips 140 disposed on a side, the same as the side where the plurality of light-emitting devices 120 are located, of the substrate 110.

In some examples, a driving chip 140 is electrically connected to at least one light-emitting device 120, and the driving chip 140 is configured to drive the at least one light-emitting device 120 to emit light.

For example, the driving chip 140 may be electrically connected to a single light-emitting device 120 and drive the single light-emitting device 120 to emit light.

For another example, the driving chip 140 may be electrically connected to four light-emitting devices 120 and drive the four light-emitting devices 120 to emit light.

For yet another example, the driving chip 140 may be electrically connected to nine light-emitting devices 120 and drive the nine light-emitting devices 120 to emit light.

A description will be made by taking an example where the driving chip 140 drives four light-emitting devices 120.

A relative positional relationship among the driving chip 140 and the four light-emitting devices 120 by which the driving chip 140 drives varies, which may refer to the description in some embodiments of the present disclosure and will not be repeated here.

In some examples, as shown in FIG. 17a, the plurality of openings 131 further include a plurality of second openings 131b. A driving chip 140 is located in a second opening 131b.

For example, the driving chip 140 corresponds to the second opening 131b, and the driving chip 140 is located at a center of the respective second opening 131b.

For example, as shown in FIG. 19, a distance between the driving chip 140 and a sidewall of the respective second opening 131b is in a range from 0.05 mm to 0.30 mm.

For example, the distance between the driving chip 140 and the sidewall of the respective second opening 131b may be 0.05 mm, 0.12 mm, 0.18 mm, 0.23 mm or 0.30 mm.

With the above arrangement, the distance between the driving chip 140 and the respective second opening 131b may be relatively small, so that a proportion of an area, occupied by the reflective layer 130, of the substrate 110 may be relatively large. As a result, it is possible to improve the reflectivity of the reflective layer 130, so that the luminous efficiency of the light-emitting substrate 100 is further improved.

Figure 21A:
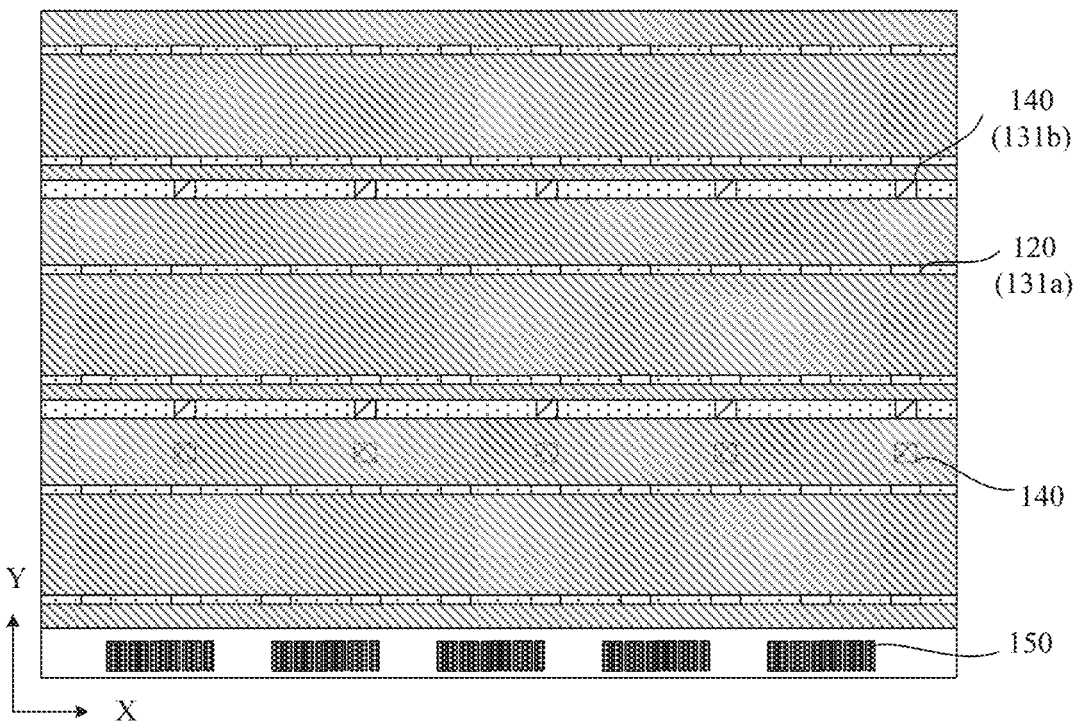
FIG. 21a is a structural diagram of a light-emitting substrate, in accordance with yet other embodiments of the present disclosure.

In some examples, as shown in FIG. 21a, an orthographic projection, on the substrate 110, of at least one driving chip 140 is located within the orthographic projection of the reflective layer 130 on the substrate 110.

Figure 21B:
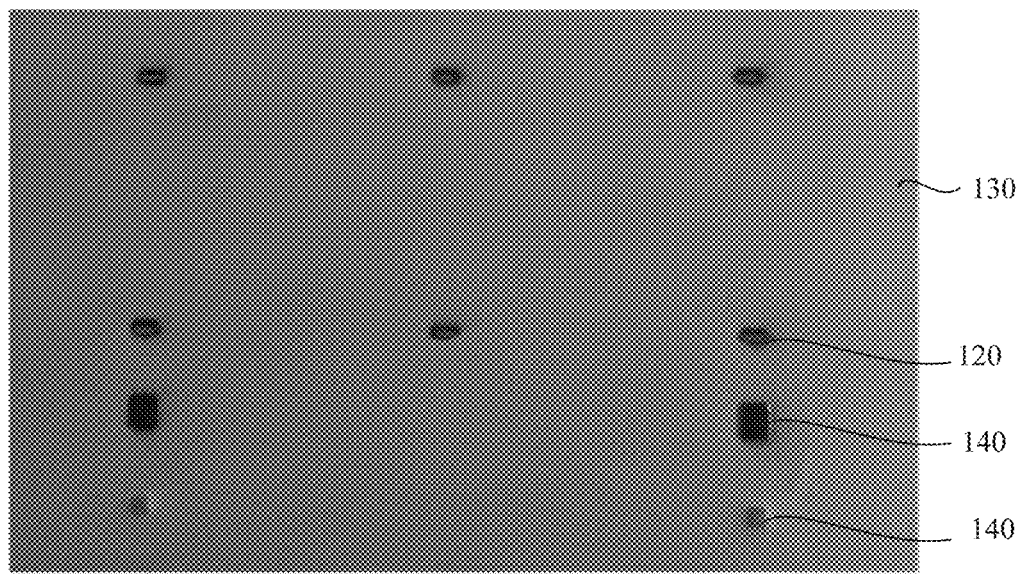

FIG. 21b is a partial diagram showing a material object of the light-emitting substrate 100 to which FIG. 21a corresponds.

For example, an orthographic projection of a driving chip 140 on the substrate 110 is located within the orthographic projection of the reflective layer 130 on the substrate 110. That is, the driving chip 140 is covered by the reflective layer 130, and remaining driving chips 140 are located in respective second openings 131b.

For example, orthographic projections, on the substrate 110, of a row of driving chips 140 are located within the orthographic projection of the reflective layer 130 on the substrate 110. That is, the row of driving chips 140 are covered by the reflective layer 130, and remaining driving chips 140 are located in respective second openings 131b.

With the above arrangement, it is possible to reduce the number of the second openings 131b of the reflective layer 130, so that a manufacturing process of the reflective layer 130 may be simplified. In addition, the reflective layer 130 may also have a certain protective effect for the driving chip 140, which prevents external moisture from entering the driving chip 140, thereby preventing the driving chip 140 from failing.

In some embodiments, as shown in FIG. 22*a*, a thickness of a portion 137, in contact with a top surface of the at least one driving chip 140, of the reflective layer 130 is less than or equal to a thickness of a portion 138, in contact with the substrate 110, of the reflective layer 130.

For example, the thickness of the portion, in contact with the top surface of the at least one driving chip 140, of the reflective layer 130 is equal to the thickness of the portion, in contact with the substrate 110, of the reflective layer 130.

For another example, the thickness of the portion, in contact with the top surface of the at least one driving chip 140, of the reflective layer 130 is less than the thickness of the portion, in contact with the substrate 110, of the reflective layer 130.

During a process of forming, by straight line printing, third reflective patterns in third printing region P3 where the at least one driving chip 140 is located, the at least one driving chip 140 protrudes from the substrate 110 relative to other regions of the substrate 110, which causes a material of the reflective layer 140 printed on the top surface of the driving chip 140 to slowly flows to a position proximate to a side surface of the driving chip 140, so that the thickness of the reflective layer 140 on the top surface of the driving chip 140 is a little bit less than the thickness of the portion, in contact with the substrate 110, of the reflective layer 140.

In some examples, as shown in FIGS. 22*a* and 22*b*, the side surface of the at least one driving chip 140 and the reflective layer 130 are provided with a gap therebetween.

For example, during a 3D printing process, there is a certain distance between a printing nozzle and the substrate 110, and between a printing nozzle and a preprinted surface such as the top surface or the side surface of the at least one driving chip 140, so that some gas will not overflow in time during a process that a reflective layer material ejected from the printing nozzle contacts the preprinted surface. Therefore, there is the gap between the side surface of the at least one driving chip 140 and the reflective layer 130.

In some examples, as shown in FIG. 22*c*, the reflective layer 130 is discontinuous at the side surface of the at least one driving chip 140.

For example, a portion, in contact with the side surface of the at least one driving chip 140, of the reflective layer 130 and the portion, in contact with the top surface of the at least one driving chip 140, of the reflective layer 130 are not connected to each other.

Figure 23A:
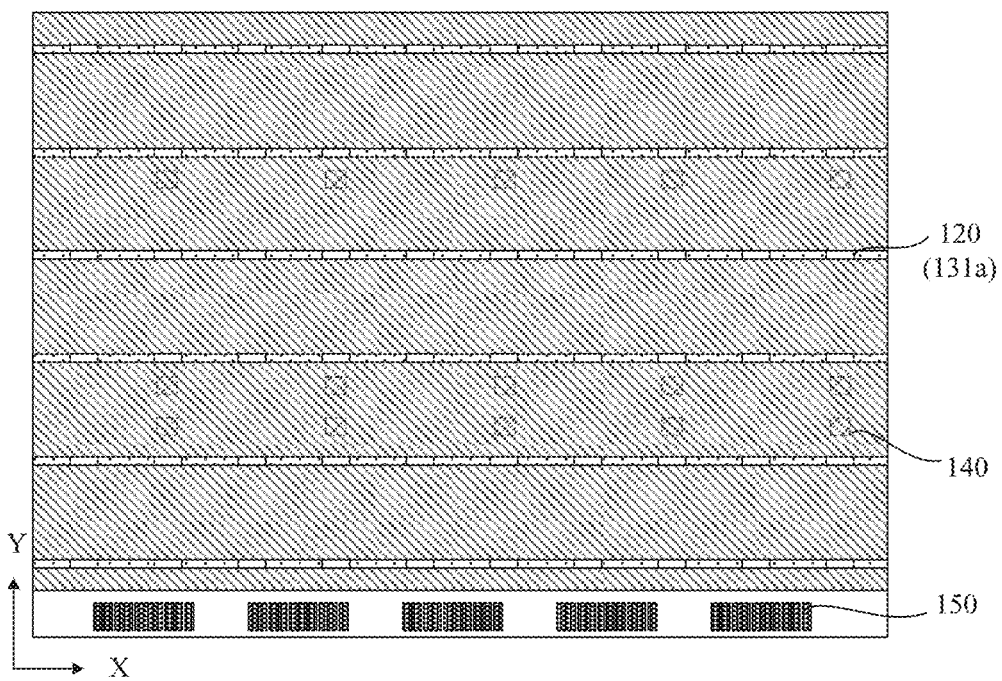
FIG. 23a is a structural diagram of a light-emitting substrate, in accordance with yet other embodiments of the present disclosure.

In some examples, as shown in FIG. 23*a*, orthographic projections of driving chips 140 on the substrate 110 are located within the orthographic projection of the reflective layer 130 on the substrate 110.

Figure 23B:
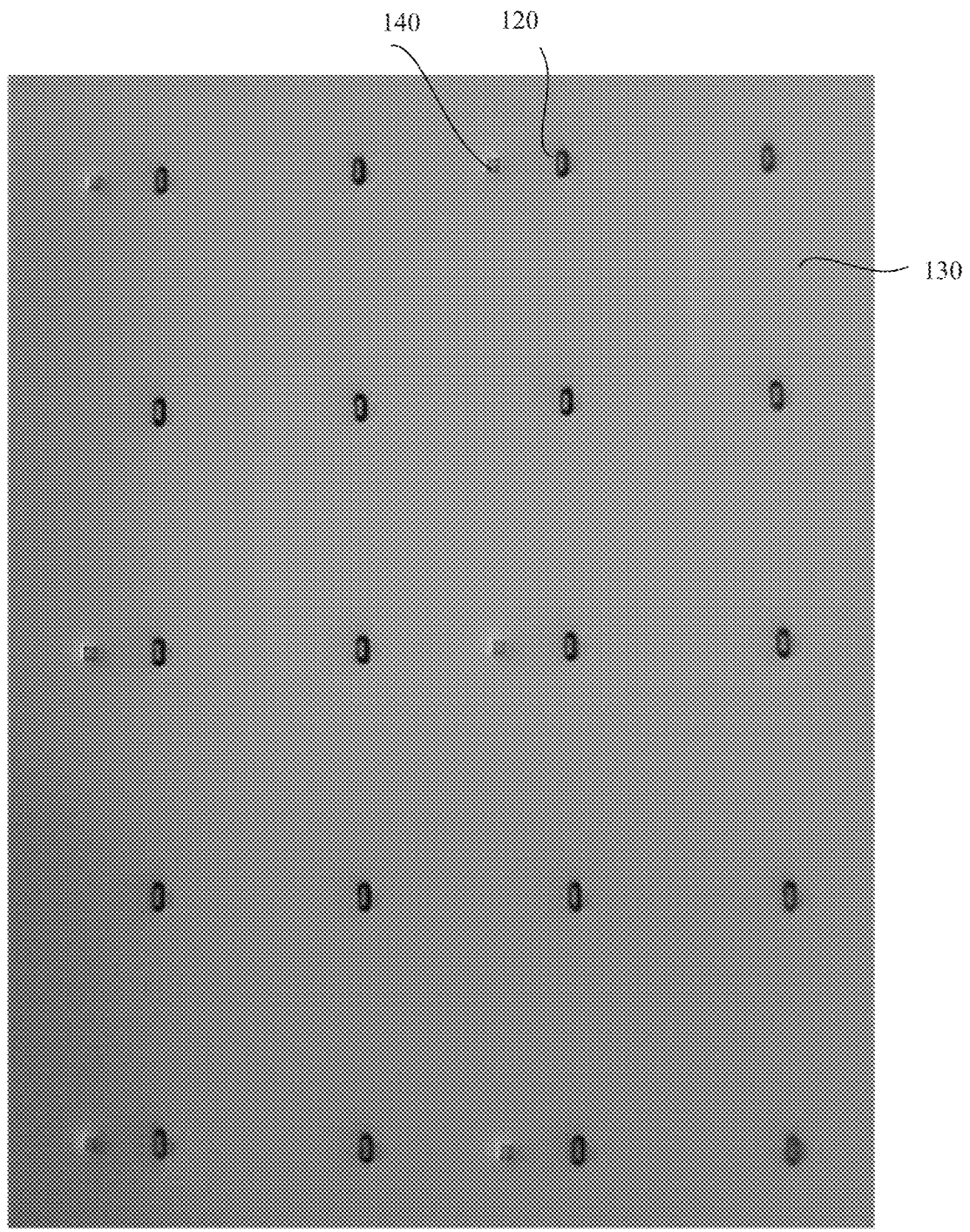

FIG. 23*b* is a partial diagram showing a material object of the light-emitting substrate 100 to which FIG. 23*a* corresponds.

With the above arrangement, it is possible to reduce the number of the openings 131 of the reflective layer 130, so that the manufacturing process of the reflective layer 130 may be simplified. In addition, the reflective layer 130 may also have the certain protective effect for the driving chip 140, which avoids an undesirable phenomenon such as corrosion or electric leakage of the driving chip 140 caused by a fact that the external moisture enters the driving chip 140.

In some examples, as shown in FIG. 23*a*, the light-emitting substrate 100 further includes a bonding structure 150. The bonding structure 150 is electrically connected to the driving chips 140, for example.

For example, the bonding structure 150 is located on a side of the light-emitting substrate 100 proximate to an edge of the light-emitting substrate 100. The bonding structure 150 is used for transmitting a different type of working signal to the driving chip 140, and the driving chip 140 may generate a driving signal according to the different type of working signal and transmit the driving signal to a respective light-emitting device 120.

For example, a region where the bonding structure 150 is located is not covered by the reflective layer 130.

For example, the chip on film (COF) may be used for achieving bonding between the bonding structure 150, and a PCB or a flexible printed circuit (FPC).

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A light-emitting substrate, comprising:
    a substrate;
    a plurality of light-emitting devices and a reflective layer that are disposed on a side of the substrate; and
    a plurality of driving chips disposed on a side, the same as the side where the plurality of light-emitting devices are located, of the substrate, wherein
    the reflective layer has a plurality of openings, and the plurality of openings include a plurality of first openings; a light-emitting device of the plurality of light-emitting devices is located in a first opening of the plurality of first openings;
    a surface of the reflective layer away from the substrate has a plurality of protruding structures;
    a driving chip of the plurality of driving chips is electrically connected to at least one light-emitting device of the plurality of light-emitting devices, and the driving chip is configured to drive the at least one light-emitting device to emit light; and
    an orthographic projection of at least one driving chip of the plurality of driving chips on the substrate is located within an orthographic projection of the reflective layer on the substrate.

2. The light-emitting substrate according to claim 1, wherein the reflective layer includes a plurality of first portions and a plurality of second portions, a first portion of the plurality of first portions is a portion, corresponding to a protruding structure of the plurality of protruding structures, of the reflective layer, and a second portion of the plurality of second portions is a portion, located between two adjacent protruding structures of the plurality of protruding structures, of the reflective layer; wherein
    a difference between a thickness of the first portion and a thickness of the second portion is less than or equal to 20 µm;
    and/or
    the difference between the thickness of the first portion and the thickness of the second portion is less than or equal to 20% of a thickness of the reflective layer.

3. The light-emitting substrate according to claim 1, wherein a distance between the light-emitting device and a sidewall of the respective first opening is in a range from 0.05 mm to 0.3 mm.

4. The light-emitting substrate according to claim 1, wherein an included angle between at least one sidewall of the first opening and the substrate is an acute angle; and/or
at least one sidewall of the first opening is in a shape of a curved surface.

5. The light-emitting substrate according to claim 1, wherein a surface of a protruding structure of the plurality of protruding structures away from the substrate is in a shape of a cambered surface.

6. The light-emitting substrate according to claim 1, wherein
the plurality of protruding structures include a plurality of first protruding structures and a plurality of second protruding structures;
the plurality of first protruding structures each extend in a first direction and are arranged in rows in a second direction;
the plurality of second protruding structures each extend in the first direction and are arranged in rows in the second direction; or the plurality of second protruding structures each extend in the second direction and are arranged in columns in the first direction; wherein
the first direction intersects the second direction.

7. The light-emitting substrate according to claim 6, wherein a dimension, in a direction where the plurality of first protruding structures are arranged, of a first protruding structure of the plurality of first protruding structures is greater than or equal to a dimension, in a direction where the plurality of second protruding structures are arranged, of a second protruding structure of the plurality of second protruding structures.

8. The light-emitting substrate according to claim 1, wherein at least one edge of an orthographic projection, on the substrate, of the reflective layer includes a plurality of curved segments, and at least one curved segment of the plurality of curved segments protrudes towards a direction where an edge of the substrate is located; and/or
an included angle between at least one side surface, proximate to an edge of the substrate, of the reflective layer and the substrate is an acute angle.

9. The light-emitting substrate according to claim 1, wherein a thickness of a portion, in contact with a top surface of the at least one driving chip, of the reflective layer is less than or equal to a thickness of a portion, in contact with the substrate, of the reflective layer.

10. The light-emitting substrate according to claim 1, wherein at least one side surface of the at least one driving chip and the reflective layer are provided with a gap therebetween.

11. The light-emitting substrate according to claim 1, wherein the reflective layer is discontinuous at at least one side surface of the at least one driving chip.

12. A method of manufacturing a light-emitting substrate, comprising:
providing a substrate;
fixing a plurality of light-emitting devices on the substrate; and
forming a reflective layer on the substrate by three-dimensional (3D) printing; wherein the reflective layer has a plurality of openings, and the plurality of openings include a plurality of first openings; a light-emitting device of the plurality of light-emitting devices is located in a first opening of the plurality of first openings; a surface of the reflective layer away from the substrate has a plurality of protruding structures;
wherein the plurality of light-emitting devices are arranged in a plurality of columns in a first direction, and are arranged in a plurality of rows in a second direction; the first direction intersects the second direction;
the substrate has a plurality of first printing regions, a plurality of second printing regions and a plurality of third printing regions each extending in the first direction; the plurality of second printing regions and the plurality of third printing regions are alternately arranged, and any adjacent second printing region and third printing region are provided a first printing region therebetween;
a row of light-emitting devices of the plurality of light-emitting devices are located in a second printing region of the plurality of second printing regions; and
forming the reflective layer on the substrate by 3D printing includes:
forming, by straight line printing, first reflective patterns in two first printing regions that are on two opposite sides of each row of light-emitting devices;
forming, by dashed line printing, a second reflective pattern between any two adjacent light-emitting devices in each second printing region; wherein first reflective patterns and second reflective patterns that are around each light-emitting device enclose a respective first opening of the plurality of first openings; an included angle between at least one sidewall of the first opening and the substrate is an acute angle, and/or at least one sidewall of the first opening is a curved surface; and
forming third reflective patterns in the third printing regions by straight line printing.

13. The method according to claim 12, wherein before forming the reflective layer on the substrate by 3D printing, the method further comprises:
fixing a plurality of driving chips on the substrate; wherein the plurality of driving chips are arranged in columns in the first direction, and are arranged in rows in the second direction; a row of driving chips of the plurality of driving chips are located in another second printing region of the plurality of second printing regions;
the plurality of openings further include a plurality of second openings;
forming the reflective layer on the substrate by 3D printing further includes:
forming, by straight line printing, first reflective patterns in two first printing regions that are on two opposite sides of each row of driving chips; and
forming, by dashed line printing, a second reflective pattern between any two adjacent driving chips in each second printing region; wherein first reflective patterns and second reflective patterns that are around each driving chip enclose a second opening; an included angle between at least one sidewall of the second opening and the substrate is an acute angle, and/or at least one sidewall of the second opening is a curved surface.

14. The method according to claim 12, wherein before forming the reflective layer on the substrate by 3D printing, the method further comprises:
fixing a plurality of driving chips on the substrate; wherein the plurality of driving chips are arranged in columns in the first direction, and are arranged in rows in the second direction; at least part of the plurality of driving chips are located in the plurality of third printing regions;

forming the reflective layer on the substrate by 3D printing includes:

forming, by straight line printing, the third reflective patterns in the third printing regions where the at least part of the plurality of driving chips are located; wherein orthographic projections of the at least part of the plurality of driving chips on the substrate are located within orthographic projections of the third reflective patterns on the substrate.

15. The method according to claim 12, wherein a printing direction of straight line printing is the same as or perpendicular to a printing direction of dashed line printing.

16. A backlight module, comprising the light-emitting substrate according to claim 1, and an optical film located on a light exit side of the light-emitting substrate.

17. A display apparatus, comprising: the backlight module according to claim 16;

a color filter substrate located on a light exit side of the backlight module; and an array substrate located between the backlight module and the color filter substrate.

* * * * *